(12) United States Patent
Fukuzato

(10) Patent No.: US 7,584,300 B2
(45) Date of Patent: Sep. 1, 2009

(54) INFORMATION PROCESSING SYSTEM, MOBILE PHONE AND INFORMATION PROCESSING SERVER

(75) Inventor: Atsushi Fukuzato, Tokyo (JP)

(73) Assignee: NEC Corporation, Tokyo (JP)

( * ) Notice: Subject to any disclaimer, the term of this patent is extended or adjusted under 35 U.S.C. 154(b) by 1099 days.

(21) Appl. No.: 10/757,605

(22) Filed: Jan. 15, 2004

(65) Prior Publication Data

US 2004/0147253 A1 Jul. 29, 2004

(30) Foreign Application Priority Data

Jan. 20, 2003 (JP) ............................. 2003-011402

(51) Int. Cl.
- *G06F 15/173* (2006.01)
- *G06F 15/16* (2006.01)
- *G06F 17/00* (2006.01)
- *G06F 17/30* (2006.01)
- *H04M 3/42* (2006.01)

(52) U.S. Cl. ................ 709/240; 709/201; 709/203; 709/217; 709/219; 709/227; 709/228; 709/229; 709/232; 707/10; 455/414.1

(58) Field of Classification Search ............... 709/203, 709/240, 201, 217, 219, 227, 228, 229, 232; 707/10; 455/414.1
See application file for complete search history.

(56) References Cited

U.S. PATENT DOCUMENTS

| | | | | |
|---|---|---|---|---|
| 4,437,156 A | * | 3/1984 | Christopher et al. | 708/139 |
| 5,442,771 A | * | 8/1995 | Filepp et al. | 709/219 |
| 5,853,367 A | * | 12/1998 | Chalek et al. | 600/437 |
| 5,974,568 A | * | 10/1999 | McQueen | 714/38 |
| 6,151,643 A | | 11/2000 | Cheng et al. | |
| 6,199,100 B1 | * | 3/2001 | Filepp et al. | 709/203 |
| 6,279,150 B1 | * | 8/2001 | Bachmann | 717/136 |
| 6,332,025 B2 | * | 12/2001 | Takahashi et al. | 380/281 |
| 6,381,709 B1 | * | 4/2002 | Casagrande et al. | 714/18 |

(Continued)

FOREIGN PATENT DOCUMENTS

EP 0 811 942 A2 12/1997

(Continued)

*Primary Examiner*—Yasin M Barqadle
*Assistant Examiner*—Richard G Keehn
(74) *Attorney, Agent, or Firm*—McGinn IP Law Group, PLLC

(57) ABSTRACT

An information processing server includes a server storage device in which plural objects are stored. Each object includes the unique information and the URL for accessing to an information processing server for updating. A mobile terminal transmits an install request including an install list. In the install list, the information unique to an object, as needed for installation, among plural objects, and the URL, are stated by the mobile terminal. The information processing server refers to the install list to select objects to be transmitted, from the plural objects stored in a server storage device, and transmits the selected object to the mobile terminal. Thus, the user only has to select the URL and the information unique to the needed object, as an object desired to be actually used, with the aid of the mobile terminal. Thus, with the information processing system according to the present invention, the object to be employed by the user may promptly be acquired, without the necessity of requesting a download menu from the server, using a terminal.

47 Claims, 26 Drawing Sheets

U.S. PATENT DOCUMENTS

| | | | |
|---|---|---|---|
| 6,434,568 B1 * | 8/2002 | Bowman-Amuah | 707/103 R |
| 6,438,594 B1 * | 8/2002 | Bowman-Amuah | 709/225 |
| 6,457,076 B1 | 9/2002 | Cheng et al. | |
| 6,463,427 B1 * | 10/2002 | Wu | 707/3 |
| 6,496,979 B1 | 12/2002 | Chen et al. | |
| 6,757,706 B1 * | 6/2004 | Dong et al. | 709/203 |
| 6,829,655 B1 * | 12/2004 | Huang et al. | 709/248 |
| 6,928,458 B2 * | 8/2005 | Cedola et al. | 707/203 |
| 6,996,633 B2 * | 2/2006 | Wu | 709/224 |
| 7,136,903 B1 | 11/2006 | Phillips et al. | 709/217 |
| 7,158,971 B1 * | 1/2007 | Bascom | 707/10 |
| 7,171,651 B1 * | 1/2007 | Greenberg et al. | 717/120 |
| 7,206,806 B2 * | 4/2007 | Pineau | 709/203 |
| 7,272,815 B1 * | 9/2007 | Eldridge et al. | 717/101 |
| 7,287,089 B1 * | 10/2007 | Lamoureux et al. | 709/238 |
| 7,415,707 B2 | 8/2008 | Taguchi et al. | |
| 2002/0072355 A1 | 6/2002 | Jeong et al. | |
| 2002/0111973 A1 * | 8/2002 | Maddalozzo et al. | 707/526 |
| 2004/0002943 A1 * | 1/2004 | Merrill et al. | 707/1 |

FOREIGN PATENT DOCUMENTS

| | | | |
|---|---|---|---|
| GB | 2 369 701 A | | 6/2002 |
| JP | 58181393 A | * | 10/1983 |
| JP | 10-21061 | | 1/1998 |
| JP | 10-91407 | | 4/1998 |
| JP | 10-207710 | | 8/1998 |
| JP | 2001-134688 | | 5/2001 |
| JP | 2001-521247 | | 11/2001 |
| JP | 2002-278767 | | 9/2002 |
| JP | 2002-318692 | | 10/2002 |
| WO | WO 99/22304 | | 5/1999 |

* cited by examiner

FIG. 4

| OBJECT | UNIQUE INFORMATION | URL | SET-UP PROGRAM CODE |
|---|---|---|---|
| 5-1 | 6-1 | | |
| 5-2 | 6-2 | | |
| 5-3 | 6-3 | | |
| 5-4 | 6-4 | | |
| 5-5 | 6-5 | | |
| 5-6 | 6-6 | | |
| 5-7 | 6-7 | | |
| 5-8 | 6-8 | | |
| 5-9 | 6-9 | | |
| 5-10 | 6-10 | | |
| 5-11 | 6-11 | | |
| 5-12 | 6-12 | | |
| 5-13 | 6-13 | | |
| 5-14 | 6-14 | | |
| 5-15 | 6-15 | | |
| ⋮ | ⋮ | ⋮ | ⋮ |
| 5-m | 6-m | | |

| UNIQUE INFORMATION | URL | INSTALL STATE INFORMATION |
|---|---|---|
| 5-1 / 6-1 | | INSTALLED |
| 5-2 / 6-2 | | INSTALLED |
| 5-3 / 6-3 | | INSTALLED |
| 5-4 / 6-4 | | INSTALLED |
| 5-5 / 6-5 | | INSTALLED |
| 5-6 / 6-6 | | INSTALLED |
| 5-7 / 6-7 | | INSTALLED |
| 5-8 / 6-8 | | INSTALLED |
| 5-9 / 6-9 | | INSTALLED |
| 5-10 / 6-10 | | INSTALLED |
| 5-11 / 6-11 | | |
| 5-12 / 6-12 | | |
| 5-13 / 6-13 | | |
| 5-14 / 6-14 | | |
| 5-15 / 6-15 | | |
| ⋮ | ⋮ | ⋮ |
| 5-m / 6-m | | |

FIG. 11

32: INSTALLED LIST

| TERMINAL IDENTIFICATION INFORMATION | UNIQUE INFORMATION | URL |
|---|---|---|
| 5-1 | | 6-1 |
| 5-2 | | 6-2 |
| 5-3 | | 6-3 |
| 5-4 | | 6-4 |
| 5-5 | | 6-5 |
| 5-6 | | 6-6 |
| 5-7 | | 6-7 |
| 5-8 | | 6-8 |
| 5-9 | | 6-9 |
| 5-10 | | 6-10 |

34: UNNEEDED OBJECT LIST

| TERMINAL IDENTIFICATION INFORMATION | UNIQUE INFORMATION | URL |
|---|---|---|
| 5-1 | | |
| 5-2 | | |
| 5-3 | | |

8-j points to the first column; 6-1, 6-2, 6-3 point to the URL column rows.

FIG. 13

33: INSTALL EXECUTE SEQUENCE

| TERMINAL IDENTIFICATION INFORMATION | EXECUTE SEQUENCE | UNIQUE INFORMATION | URL |
|---|---|---|---|
| | 1 | | |
| | 2 | | |
| | 3 | | |

FIG. 16

35: LIST OF STATE OF USE OF THE OBJECTS

| TERMINAL IDENTIFICATION INFORMATION | UNIQUE INFORMATION | URL | STATE OF USE OF OBJECTS |
|---|---|---|---|
| 5-1 | 6-1 | | PRESENTLY DELETED OBJECTS (UNNEEDED OBJECTS) |
| 5-2 | 6-2 | | |
| 5-3 | 6-3 | | |
| 5-4 | 6-4 | | OBJECTS ALREADY INSTALLED (INSTALLED OBJECTS) |
| 5-5 | 6-5 | | |
| 5-6 | 6-6 | | |
| 5-7 | 6-7 | | |
| 5-8 | 6-8 | | |
| 5-9 | 6-9 | | |
| 5-10 | 6-10 | | |
| 5-11 | 6-11 | | NEWLY INSTALLED OBJECTS (OBJECTS OF SELECTION) |
| 5-12 | 6-12 | | |
| 5-13 | 6-13 | | |

FIG. 21

41: MALFUNCTION REPORT

| TERMINAL IDENTIFICATION INFORMATION | UNIQUE INFORMATION | URL |
|---|---|---|
| 5-11 | | |
| 5-12 | | |
| 5-13 | | |

42: RECOVERY REQUEST LIST

| TERMINAL IDENTIFICATION INFORMATION | UNIQUE INFORMATION | URL |
|---|---|---|
| 5-4 | | 6-4 |
| 5-5 | | 6-5 |
| 5-6 | | 6-6 |
| 5-7 | | 6-7 |
| 5-8 | | 6-8 |
| 5-9 | | 6-9 |
| 5-10 | | 6-10 |
| 5-11 | | 6-11 |
| 5-12 | | 6-12 |
| 5-13 | | 6-13 |

44: LIST OF UNNEEDED RECOVERY OBJECTS

| TERMINAL IDENTIFICATION INFORMATION | UNIQUE INFORMATION | URL |
|---|---|---|
| 5-11 | | 6-11 |
| 5-12 | | 6-12 |
| 5-13 | | 6-13 |

45: LIST OF STATE OF USE OF THE OBJECTS

| TERMINAL IDENTIFICATION INFORMATION | UNIQUE INFORMATION | URL | STATE OF USE OF OBJECTS |
|---|---|---|---|
| 5-1 | 6-1 | | NEWLY INSTALLED OBJECTS |
| 5-2 | 6-2 | | |
| 5-3 | 6-3 | | |
| 5-4 | 6-4 | | OBJECTS ALREADY INSTALLED (INSTALLED OBJECTS) |
| 5-5 | 6-5 | | |
| 5-6 | 6-6 | | |
| 5-7 | 6-7 | | |
| 5-8 | 6-8 | | |
| 5-9 | 6-9 | | |
| 5-10 | 6-10 | | |
| 5-11 | 6-11 | | PRESENTLY DELETED OBJECTS |
| 5-12 | 6-12 | | |
| 5-13 | 6-13 | | |

INFORMATION PROCESSING SYSTEM, MOBILE PHONE AND INFORMATION PROCESSING SERVER

FIELD OF THE INVENTION

This invention relates to an information processing system and, more particularly, to an information processing system in which an object from an information processing server is installed by a mobile phone.

BACKGROUND OF THE INVENTION

In a conventional information processing system, a download menu is requested to a server, using a terminal. A user of the terminal selects an object which the user is going to use from the download menu, using a terminal, and subsequently acquires the object (see for example the Patent Publications 1 to 3).

In the Patent Publication 1, the terminal and the server correspond to a mobile terminal and to a server apparatus, as set forth in claim 1 thereof, respectively. Likewise, in the Patent Publication 1, the download menu and the object correspond to the list of application programs and to the application program, as set forth in claim 1 thereof, respectively.

In the Patent Publication 2, the terminal and the server correspond to a computer and to a software-supplying host apparatus, as set forth in claim 1 thereof, respectively. Likewise, in the Patent Publication 2, the object corresponds to the software as set forth in claim 1 thereof.

In the Patent Publication 3, the terminal corresponds to the mobile terminal device as set forth in claim 1 thereof. Likewise, in the Patent Publication 3, the download menu and the object correspond to the list of applications and the application, as set forth in claim 1 thereof, respectively.

It is desirable that the user be able to promptly acquire the object which the user is going to use, without the necessity of requesting a download menu (install menu) to a server, by using a terminal, as in the case of a conventional information processing system.

[Publication 1]
JP Patent Kokai Publication No. JP-P2002-278767A
[Publication 2]
JP Patent Kokai Publication No. JP-A-10-207710
[Publication 3]
JP Patent Kokai Publication No. JP-P2001-134688A

SUMMARY OF THE DISCLOSURE

Accordingly, it is an object of the present invention to provide an information processing system, a mobile terminal, and an information processing server, capable of promptly acquiring an object to be used by a user.

It is another object of the present invention to provide an information processing system, a mobile terminal, and an information processing server, in which a user is able to use an installed object without confusion.

The above and other objects are attained by an information processing system in accordance with one aspect of the present invention, which comprises: an information processing server connected to a network and including a server storage device having a plurality of objects stored therein, each object having unique information and a URL (Uniform Resource Locator) for accessing to said information processing server for updating; and a mobile terminal being connected to said network for transmitting an install request including an install list including said unique information and the URL of an object among said plural objects that is necessary for installation; said information processing server referring to said install list to select an object for transmission from said plural objects stored in said server storage device to transmit the selected object.

A mobile terminal, in accordance with one aspect of the present invention, which is connected over a network to an information processing server including a server storage device having stored therein a plurality of objects, includes: a management unit for forming an install list; each of said objects including unique information and a URL (Uniform Resource Locator) for accessing said information processing server for updating; said unique information and the URL of needed object necessary for installation, among said plural objects, are stated in said install list; and a communication unit for transmitting an install request including said install list to said information processing server; said install request being such information in which said information processing server refers to said install list to select the object for transmission from said plural objects stored in said server storage device to transmit the selected object to said communication unit.

An information processing server in accordance with one aspect of the present invention, which is connected to a mobile terminal over a network, comprises: a server storage device having stored therein a plurality of objects, each of said objects including unique information and a URL (Uniform Resource Locator) for accessing to the information processing server for updating; a server communication unit for receiving an install request from said mobile terminal; said install request including an install list having therein said unique information and the URL of a needed object, among said plural objects, that is necessary for installation; and a server management unit for referring to said install list for selecting an object for transmission from the plural objects stored in said server storage device; said server communication unit transmitting the selected object to said mobile terminal.

In the following, means for attaining the above object is now explained using the numerals and symbols used in the preferred embodiments of the invention. These numerals and symbols, added for clarifying the relationship of correspondence between the description of the claims and that of the preferred embodiments of the invention, are not to be used for interpreting the technical scope of the invention set forth in the claims.

An information processing system according to one aspect of the present invention includes an information processing server (2) and a mobile terminal (1-*j*, where j=1, 2, 3, . . . , n). The information processing server (2) and the mobile terminal (1-*j*) are connected to a network (3). The information processing server (2) includes server storage devices (20, 26) where plural objects (4-1 to 4-*m*) are stored. Each of the plural objects (4-1 to 4-*m*) includes the unique information (5-1 to 5-*m*) and the URL (6-1 to 6-*m*) for accessing to the information processing server (2) for updating.

The mobile terminal (1-*j*) sends an install request (30), which includes an install list (31). In this install list (31), there are stated by the mobile terminal (1-*j*) the unique information (5-11) and the URL (6-11) of the object among the plural objects (4-1 to 4-*m*) which is necessary for installation.

The information processing server (2) refers to the install list (31) to select, from the objects (4-1 to 4-*m*) stored in the server storage devices (20, 26), the objects to be transmitted (4-11 to 4-13), to send the selected objects (4-11 to 4-13) (also referred to below as objects of selection (4-11 to 4-13)) to the mobile terminal (1-*j*).

Thus, in the information processing system according to the present invention, the user only has to select the unique information (5-11) and the URL (6-11) of the needed object (4-11) which is the object actually desired to be used. Thus, in the information processing system according to the present invention, there is no necessity of requesting a download menu (install menu) from the server, using a terminal, as in the conventional information processing system, so that the user is able to acquire the object promptly.

In the information processing system according to the present invention, the mobile terminal (1-*j*) includes terminal storage devices (10, 16) having installed therein a group of objects (4-1 to 4-10) among the plural objects (4-1 to 4-*m*).

The install request (30) further includes an installed list (32), which has therein the unique information (5-1 to 5-10) and the URL (6-1 to 6-10) of the group of objects (4-1 to 4-10) stated by the terminal storage devices (10, 16).

The information processing server (2) refers to the installed list (32) to form a list (34) of unneeded objects stating the unique information (5-1 to 5-3) and the URL (6-1 to 6-3) of the unneeded objects (4-1 to 4-3), among the objects of the object group (4-1 to 4-10), which become unnecessary when the selected objects (4-11 to 4-13) have been installed on the terminal storage devices (10, 16). The information processing server (2) sends the list (34) of unneeded objects to the mobile terminal (1-*j*) along with the selected objects (4-11 to 4-13).

Thus, in the information processing system according to the present invention, the unneeded objects (4-1 to 4-3), which become unnecessary when the mobile terminal (1-*j*) has installed the selected objects (4-11 to 4-13) in the terminal storage devices (10, 16), are deleted. As a consequence, it is unnecessary for the user to search and delete the unneeded objects (4-1 to 4-3), in the information processing system according to the present invention, such that the user is able to use the updated group of objects (4-4 to 4-13), installed (updated) on the terminal storage devices (10, 16), without confusion.

The information processing system according to the present invention includes an information processing server (2) and a mobile terminal (1-*j*), where j=1, 2, 3, . . . , n. The information processing server (2) and the mobile terminal (1-*j*) are connected to the network (3). The information processing server (2) includes a server storage device (20, 26) where plural objects (4-1 to 4-*m*) are stored. The mobile terminal (1-*j*) includes terminal storage devices (10, 16) in which objects of the object group (4-1 to 4-10) among the plural objects (4-1 to 4-*m*) are installed.

The mobile terminal (1-*j*) sends the install request (30) to the information processing server (2). The install request (30) includes an install list (31) representing a needed object (4-11) among the plural objects that is necessary for installation and an installed list (32) representing the objects of the group of objects (4-1 to 4-10) installed in the terminal storage device (10, 16).

The information processing server (2) refers to the install list (31) to select an object for transmission from the plural objects (4-1 to 4-*m*) stored in a server storage device (20, 26). The information processing server (2) also refers to the installed list (32) to form a list (34) of unneeded objects, among the objects of the group of objects (4-1 to 4-10). The unneeded objects are objects which become unnecessary when the selected objects (4-11 to 4-13) have been installed on the terminal storage devices (10, 16). The information processing server sends the selected objects (4-11 to 4-13) and the list of unneeded object (34) to the mobile terminal (1-*j*).

Thus, in the information processing system according to the present invention, the unneeded objects (4-1 to 4-3), which become unnecessary when the mobile terminal (1-*j*) has installed the selected objects (4-11 to 4-13) in the terminal storage device (10, 16), are deleted. As a consequence, in the information processing system according to the present invention, it is unnecessary for the user to search and delete the unneeded objects (4-1 to 4-3), such that the user is able to use the updated group of objects (4-4 to 4-13), installed (updated) on the terminal storage device (10, 16), without confusion.

In the information processing system according to the present invention, each of the plural objects (4-1 to 4-*m*) includes the unique information (5-1 to 5-*m*) and the URL (6-1 to 6-*m*) for accessing to the information processing server for updating).

The install list (31) has therein the unique information (5-11) and the URL (6-11) of the objects of the object group (4-1 to 4-10) stated by the mobile terminal (1-*j*).

The installed list (32) has therein the unique information (5-1 to 5-10) and the URL (6-1 to 6-10) of the group of objects (4-1 to 4-10) stated by the mobile terminal (1-*j*). The list of unneeded objects (34) has therein the unique information (5-1 to 5-3) and the URL (6-1 to 6-3) of the unneeded objects (4-1 to 4-3) stated by the information processing server (2).

Thus, in the information processing system according to the present invention, the user only has to select the unique information (5-11) and the URL (6-11) of the needed object (4-11), as an object actually desired to be employed, using the mobile terminal (1-*j*). Thus, in the information processing system according to the present invention, it is unnecessary to request a download menu (install menu), using the terminal, as in the conventional information processing system, such that the object to be used by the user may be acquired promptly.

In the information processing system according to the present invention, the mobile terminal (1-*j*) installs the selected object (4-11 to 4-13) from the information processing server (2) in the terminal storage devices (10, 16). The mobile terminal (1-*j*) refers to the list of unneeded objects (4-1 to 4-3) from the information processing server (2) to delete the unneeded objects (4-1 to 4-3) from the group of objects (4-1 to 4-10).

The selected objects (4-1 to 4-13) and the objects of the group of objects (4-4 to 4-10), after deletion of the unneeded objects (4-1 to 4-3), are stored by the mobile terminal (1-*j*) as objects of the updated objects (4-4 to 4-13) in the terminal storage device (10, 16).

In the information processing system according to the present invention, the install request (30) further includes the terminal identification information (8-*j*) for discriminating the mobile terminal (1-*j*). The information processing server (2) forms a list of state of use of the objects (35), responsive to the install request (30), to store the list in the server storage devices (20, 26).

The list of state of use of the objects (35) includes therein the terminal identification information (8-*j*), the unique information (5-1 to 5-3) and the URL (6-1 to 6-3) of the unneeded objects (4-1 to 4-3), presently deleted, the unique information (5-4 to 5-10) and the URL (6-4 to 6-10) of the group of objects (4-4 to 4-10), having the unneeded objects (4-1 to 4-3) deleted, and the unique information (5-11 to 5-13) and the URL (6-11 to 6-13) of presently newly installed selected objects (4-11 to 4-13), stated by the information processing server (2).

Thus, in the information processing system according to the present invention, since the information processing server (2) forms the list of state of use of the objects (35) to store the list in the server storage device (20 to 26), the updated object group (4-4 to 4-13) installed on the mobile terminal (1-j) may be comprehended by the information processing server (2).

In the information processing system according to the present invention, the mobile terminal (1-j) sends a recovery request (40), as the install request for restoring the updated group of objects (4-4 to 4-13) installed in the terminal storage device (10, 16) to the group of objects (4-1 to 4-10) when a malfunction occurs in executing the group of the updated objects (4-4 to 4-13) installed in the terminal storage devices (10, 16).

This recovery request (40) includes a recovery request list (42) has stated therein by the mobile terminal (1-j) the terminal identification information (8-j) and the unique information (5-4 to 5-13) and the URL (6-4 to 6-13) of the updated group of objects (4-4 to 4-13) installed in the terminal storage devices (10, 16).

The information processing server (2) refers to the recovery request list (42) and the list (35) of state of use of the objects stored in the server storage devices (20, 26) to select from the plural objects (4-1 to 4-m) stored in the server storage device (20, 26) the unneeded objects (4-1 to 4-3) to be installed by the mobile terminal (1-j) in the terminal storage device (10, 16). The information processing server (2) refers to the recovery request list (42) and the list (35) of state of use of the objects to form a list (44) of unneeded restoration objects, among the objects of the group of objects (4-4 to 4-13), having stated therein the unique information (5-11 to 5-13) and the URL (6-11 to 6-13) of the selected objects (4-11 to 4-13). The unneeded restoration objects are those objects which become unnecessary when the unneeded objects (4-1 to 4-3) have been installed in the terminal storage devices (10, 16). The information processing server (2) sends the list of unneeded restoration objects (44) to the mobile terminal (1-j) along with the unneeded objects (4-1 to 4-3).

With the information processing system according to the present invention, the information processing server (2) grasps the updated object group (4-4 to 4-13) installed in the mobile terminal (1-j). Thus, if, in the information processing system according to the present invention, a malfunction has occurred in executing the selected objects (4-11 to 4-13), installed in the terminal storage device (10, 16), that is, if a malfunction has occurred as a result of installing the selected objects (4-11 to 4-13), the updated object group (4-4 to 4-13) installed in the terminal storage device (10, 16) can be restored to the object group (4-1 to 4-10) representing the previous state).

With the information processing system according to the present invention, the information processing server (2) refers to the install list (31) to select the needed object (4-11) from the plural objects (4-1 to 4-m) stored in the server storage device (20, 26). The information processing server (2) refers to the installed list (32) to select from the plural objects (4-1 to 4-m) stored in the server storage device (20, 26) link objects (4-12, 4-13) containing the unique information (5-12, 5-13) and the URL (6-12, 6-13), which are linked to the needed object (4-11) and which are not stated in the installed list (32), and sends the needed object (4-11) and the link objects (4-12, 4-13) to the mobile terminal (1-j) as selected objects (4-11 to 4-13).

Thus, with the information processing system according to the present invention, the link objects (4-12, 4-13), linked to the needed object (4-11), as selected by the user of the mobile terminal (1-j), can be promptly acquired, as an object employed by the user, by the unique information (5-11) and the URL (6-11) of the needed object (4-11).

With the information processing system according to the present invention, the information processing server (2) forms an install execute sequence (33) for installing the needed object (4-11) and the link objects (4-12, 4-13) in a preset sequence. The information processing server (2) sends the needed object (4-11) and the link objects (4-12, 4-13) in a preset sequence to the mobile terminal (1-j).

With the information processing system according to the present invention, it may be an occurrence that, during install processing as from transmission of the install request (30, 40) from the mobile terminal (1-j) to the information processing server (2) until installing the object from the information processing server (2) to the terminal storage devices (10, 16), the communication between the mobile terminal (1-j) and the information processing server (2) is interrupted. In this case, the information processing server (2) discontinues the install processing in accordance with the install execute sequence (34).

The communication between the mobile terminal (1-j) and the information processing server (2) then becomes possible. In this case, the mobile terminal sends an installation re-initiating request (35) to the information processing server (2). On receipt of the installation re-initiating request, the information processing server (2) re-initiates the discontinued install processing in accordance with the install execute sequence (33).

Thus, with the information processing system according to the present invention, the information processing server (2) sends the needed object (4-11) and the link objects (4-12, 4-13) in accordance with the preset sequence (33), so that the install processing can be discontinued when the communication between the mobile terminal (1-j) and the information processing server (2) is discontinued and, when the communication between the mobile terminal (1-j) and the information processing server (2) is possible, the install processing, once interrupted, can be re-initiated in accordance with the install execute sequence (33).

With the information processing system according to the present invention, there are stored in the terminal storage device (10, 16) set-up program codes (7-4 to 7-13) associated with the objects of the updated object group (4-4 to 4-13), respectively.

In executing each of the objects (4-4 to 4-13) of the updated object group installed in the terminal storage device (10, 16), the mobile terminal converts each updated object (4-4 to 4-13) into a program code which is the form adapted for executing each updated object on the mobile terminal (1-j). The mobile terminal (1-j) sends to the information processing server (2) a malfunction report (41) representing each updated object, suffering from the malfunction, based on the result of collation between the program code and the set-up program codes (7-4 to 7-13).

The updated objects, suffering from the malfunction, are assumed to be the selected objects (4-11 to 4-13) installed on the terminal storage devices (10, 16). In this case, the malfunction report (41) represents the objects of selection (4-4 to 4-13). With the information processing system according to the present invention, it is possible to support the development of the objects (4-1 to 4-m) and the set-up program codes (7-1 to 7-m) by the manager of the information processing server (2) based on the malfunction report (41).

In the information processing system according to the present invention, the set-up program codes (7-1 to 7-m), associated with the plural objects (4-1 to 4-m), are stored in the server storage device (20, 26).

When the set-up program codes (7-1 to 7-m), stored in the server storage device (20, 26), are updated to the latest set-up program codes (7-1 to 7-*m*), the information processing server (2) refers to the list of state of use of the objects (35) to transmit the latest set-up program codes (7-4 to 7-13) associated with the objects (4-4 to 4-13) of the updated object group, among the plural objects (4-1 to 4*m*) stored in the server storage devices (20, 26), to the mobile terminal (1-*j*). The mobile terminal (1-*j*) updates the set-up program codes (7-4 to 7-13) stored in the terminal storage device to the latest set-up program codes (7-4 to 7-13).

In the information processing system according to the present invention, the terminal identification information (8-*j*) as well as the unique information (5-11 to 5-13) and the URL (6-11 to 6-13) of each of the updated objects (4-11 to 4-13) where the malfunction has occurred are stated by the mobile terminal (1-*j*) in the malfunction report (41). The information processing server (2) stores the malfunction report in the server storage device (20, 26).

In the information processing system according to the present invention, the set-up program code (7-1 to 7-*m*) is a program code where the malfunction occurs. The mobile terminal (1-*j*) sends the malfunction report (41) to the information processing server (2) in case of coincidence of the program code and the set-up program code (7-4 to 7-13).

In the information processing system according to the present invention, the malfunction report (41) is contained in the recovery request (40).

A mobile terminal (1-*j*; 1, 2, 3, . . . , n) according to the present invention is connected over a network (3) to an information processing server (2). The information processing server (2) includes a server storage device (20, 26) having stored therein a plurality of objects (4-1 to 4-*m*). The mobile terminal (1-*j*) includes a management unit (15) and a communication unit (12, 19).

The management unit (15) forms an install list (31). Each of the objects (4-1 to 4-*m*) includes the unique information (5-1 to 5-*m*) and the URL (6-1 to 6-*m*) for accessing the information processing server (2) for updating. The unique information (5-11) and the URL (6-11) of a needed object (4-11) necessary for installation, among the plural objects (4-1 to 4-*m*), are stated in the install list (31).

A communication unit (12, 19) transmits an install request (30) including the install list (31) to the information processing server (2). The install request (30) is such information in which the information processing server (2) refers to the install list (31) to select the object for transmission (4-11 to 4-13) from the plural objects (4-1 to 4-*m*) stored in the server storage device (20, 26) to transmit the selected objects (4-11 to 4-13) (referred to below as the objects of selection (4-11 to 4-13)) to the communication unit (12, 19).

Thus, with the mobile terminal (1-*j*) according to the present invention, it is only sufficient that the user selects the unique information (5-11) and the URL (6-11) of the needed object (4-11), as an object employed by the user, by the user's operation. Thus, with the mobile terminal (1-*j*) according to the present invention, it is unnecessary to request the download menu (install menu) from the server, as in the conventional terminal, and hence the user is able to promptly acquire the object he/she uses.

The mobile terminal (1-*j*) according to the present invention further includes a terminal storage device (10, 16) where a group of objects (4-1 to 4-10) among the plural objects (4-1 to 4-*m*) have been installed).

The management unit (15) forms an installed list (32) stating the unique information (5-1 to 5-10) and the URL (6-1 to 6-10) of the group of objects (4-1 to 4-10).

The install request (30) further includes the installed list (32). The install request (30) is such information in which the information processing server (2) refers to the installed list (32) to form a list of unneeded objects (4-1 to 4-3) having stated therein the unique information (5-1 to 5-3) and the URL (6-1 to 6-3) of unneeded objects (4-1 to 4-3), that is, objects which becomes unnecessary when the selected object (4-11 to 4-13) among the objects (4-1 to 4-10) of the object group has been installed in the terminal storage device (10, 16), with the list of unneeded objects being transmitted along with the selected object (4-11 to 4-13) to the communication unit (12, 19).

Thus, with the mobile terminal (1-*j*) according to the present invention, the unneeded objects (4-1 to 4-3), which become unnecessary when the selected objects (4-11 to 4-13) are installed in the terminal storage device (10, 16), are deleted. Consequently, with the mobile terminal (1-*j*) according to the present invention, there is no necessity for the user to search and delete the unneeded objects (4-1 to 4-3), such that the user is able to use the updated group of objects (4-4 to 4-13) installed (updated) in the terminal storage device (10, 16), without confusion.

A mobile terminal (1-*j*; 1, 2, 3, . . . , n) according to the present invention is connected over a network (3) to an information processing server (2). The information processing server (2) includes a server storage device (20, 26) having stored therein a plurality of objects (4-1 to 4-*m*). The mobile terminal (1-*j*) includes a terminal storage device (10, 16) where the objects of the object group (4-1 to 4-10) among the plural objects (4-1 to 4-*m*) have been installed, a management unit (15) and a communication unit (12, 19).

The management unit (15) forms an install list (31) and an installed list (32). The install list (31) denotes a needed object (4-11), that is, an object among plural objects which is necessary for installation. The installed list (32) represents an object group (4-1 to 4-10) installed in the terminal storage device (10, 16).

The communication unit (12, 19) sends an install request (30), including the install list (31) and the installed list (32), to the information processing server (2).

The install request is such information in which the information processing server (2) refers to the install list (31) to select the object for transmission (4-11 to 4-13) from the plural objects (4-1 to 4-*m*) stored in the server storage device (20, 26). The information processing server (2) further refers to the installed list (32) to form a list of unneeded objects (4-1 to 4-3) representing the objects which become unnecessary when the selected objects (4-11 to 4-13) among the object group (4-1 to 4-10) are installed in the terminal storage device (10, 16), with the selected object (referred to as object of selection 4-11 to 4-13) and the list (34) of unneeded objects being sent to the communication unit (12, 19).

Thus, with the mobile terminal (1-*j*) according to the present invention, the unneeded objects (4-1 to 4-3), that is, the objects which become unnecessary when the selected objects (4-11 to 4-13) are installed in the terminal storage device (10, 16), are deleted. Consequently, with the mobile terminal (1-*j*) according to the present invention, there is no necessity for the user to search and delete the unneeded objects (4-1 to 4-3), such that the user is able to use the updated group of objects (4-4 to 4-13) installed (updated) in the terminal storage device (10, 16), without confusion.

Each of the plural objects (4-1 to 4-*m*) in the mobile terminal (1-*j*) according to the present invention includes the unique information (5-1 to 5-*m*) and the URL (6-1 to 6-*m*) for accessing the information processing server (2) for updating;

The unique information (5-11) and the URL (6-11) of the needed object (4-11) are stated by the management unit (15) in the install list (31). The unique information (5-1 to 5-10)

and the URL (6-1 to 6-10) of the group of objects (4-1 to 4-10) are stated by the management unit (15) in the installed list (32). The unique information (5-1 to 5-3) and the URL (6-1 to 6-3) of the unneeded object (4-1 to 4-3) are stated by the information processing server (2) in the list of unneeded objects (34).

Thus, in the mobile terminal (1-*j*) according to the present invention, the user only has to select the unique information (5-11) and the URL (6-11) of the needed object (4-11), as an object actually desired to be employed, by the user's operation. Thus, in the mobile terminal (1-*j*) according to the present invention, it is unnecessary to request a download menu (install menu) from the server, as in the conventional terminal, such that the object to be used by the user may be acquired promptly).

The mobile terminal (1-*j*) according to the present invention further includes a controller (11). The controller (11) is the OS 11, as explained in the embodiments of the present invention, for installing the selected object (4-11 to 4-13) from the information processing server (2) in the terminal storage device (10, 16) The management unit (15) refers to the list (34) of unneeded object from the information processing server (2) to delete the unneeded object (4-1 to 4-3) from the group of objects (4-1 to 4-10).

The selected object (4-11 to 4-13) and the group of objects (4-4 to 4-10) having the unneeded objects (4-1 to 4-3) deleted are stored by the controller (11) as an updated object group (4-4 to 4-13) in the terminal storage device (10, 16).

In the mobile terminal (1-*j*) according to the present invention, the install request (30) further includes the terminal identification information (8-*j*) for discriminating the mobile terminal (1-*j*). The install request (30) is such information in which the information processing server (2) is responsive to the install request to form a list (35) of state of use of the objects for storage in the server storage device (20, 26). The list (35) of state of use of the objects has stated therein by the information processing server (2) the terminal identification information (8-*j*), the unique information (5-1 to 5-3) and the URL (6-1 to 6-3) of the unneeded objects (4-1 to 4-3), presently deleted, the unique information (5-4 to 5-10) and the URL (6-4 to 6-10) of the object group (4-4 to 4-10) having the unneeded objects (4-1 to 4-3) deleted, and the unique information (5-11 to 5-13) and the URL (6-11 to 6-13) of the presently newly installed objects of selection (4-11 to 4-13).

Thus, in the mobile terminal (1-*j*) according to the present invention, the information processing server (2) forms the list (35) of state of use of the objects for storage in the server storage device (20, 26), so that the updated object group (4-4 to 4-13) installed in the mobile terminal (1-*j*) can be grasped by the information processing server (2).

If, in the mobile terminal (1-*j*) according to the present invention, a malfunction has occurred in executing each object of the updated object group (4-4 to 4-13), installed in the terminal storage device, the communication unit (12, 19) sends to the information processing server (2) a recovery request (40) which is the install request for restoring the updated object group (4-4 to 4-13) installed in the terminal storage device (10, 16) to the object group (4-1 to 4-10).

The recovery request (40) includes a recovery request list (42), including the terminal identification information (8-*j*) and the unique information (5-4 to 5-13) and the URL (6-4 to 6-13) of the updated object group (4-4 to 4-13) installed in the terminal storage device (10, 16), stated by the mobile terminal (1-*j*). The recovery request (40) is such information in which the information processing server (2) refers to the recovery request list (42) and the list (35) of state of use of the objects stored in the server storage device (10, 16) to select from the plural objects (4-1 to 4-*m*) stored in the server storage device (20, 26) the unneeded objects (4-1 to 4-3) to be installed by the controller (11) in the terminal storage device (10, 16), with the information processing server forming a list (44) of unneeded restoration objects stating the unique information (5-11 to 5-13) and the URL (6-11 to 6-13) of the selected objects (4-11 to 4-13) which become unnecessary when the unneeded objects (4-1 to 4-3) among the objects (4-4 to 4-13) of the updated object group are installed on the terminal storage device (10, 16), with the information processing server sending the list (44) of unneeded restoration objects along with the unneeded object (4-1 to 4-3) to the communication unit (12, 19).

In the mobile terminal (1-*j*) according to the present invention, described above, the information processing server (2) grasps the updated object group (4-4 to 4-13) installed in the mobile terminal (1-*j*). Thus, in the mobile terminal (1-*j*) according to the present invention, when a malfunction has occurred in executing the selected objects (4-11 to 4-13) installed in the mobile terminal (1-*j*), that is, if a malfunction has occurred as a result of executing the selected object (4-11 to 4-13), it is possible to restore the updated object group (4-4 to 4-13) installed in the terminal storage device (10, 16) to the original state, that is, to the state of the object group (4-1 to 4-10).

In the mobile terminal (1-*j*) according to the present invention, the install request (30) is such information in which the information processing server (2) refers to the install list (31) to select the needed object (4-11) from the plural objects (4-1 to 4-*m*) stored in the server storage device (20, 26), and in which the information processing server also refers to the installed list (32) to select from the plural objects (4-1 to 4-*m*) stored in the server storage device (20, 26) link objects (4-12, 4-13) which are linked to the needed object (4-11) and which include the unique information (5-12, 5-13) and the URL (6-12, 6-13) not stated in the installed list (32) to send the needed object (4-11) and the link objects (4-12, 4-13) as the selected objects (4-11 to 4-13) to the communication unit (12, 19).

Thus, in the mobile terminal (1-*j*) according to the present invention, the link objects (4-12, 4-13) linked to the needed object (4-11) can be promptly acquired, as the objects to be employed by the user, by the unique information (5-11) and the URL (6-11) of the needed object (4-11) as selected by the user of the mobile terminal (1-*j*).

In the mobile terminal (1-*j*) according to the present invention, the install request (30) is such information in which the information processing server (2) forms an install execute sequence (33) for installing the needed object (4-11) and the link objects (4-12, 4-13) in a preset sequence to send the needed object (4-11) and the link objects (4-12, 4-13) in a preset sequence to the communication unit (12, 19) in accordance with the install execute sequence).

In the mobile terminal (1-*j*) according to the present invention, it may be an occurrence that the communication between the communication unit (12, 19) and the information processing server (2) is interrupted during the install processing as from transmission of the install request (30, 40) by the communication unit (12, 19) to the information processing server (2) until the object from the information processing server (2) is installed by the controller (11) in the terminal storage device (10, 16). In such case, the install processing is discontinued by the information processing server (2) in accordance with the install execute sequence (33).

The communication between the communication unit (12, 19) and the information processing server (2) subsequently becomes possible. In this case, the communication unit (12, 19) sends an installation re-initiating request (35) for re-initiating the discontinued install processing to the information processing server (2) in accordance with the install execute sequence (33).

Thus, in the mobile terminal (1-*j*) according to the present invention, in which the information processing server (2) sends the needed object (4-11) and the link objects (4-12, 4-13) in a preset sequence to the mobile terminal (1-*j*) in accordance with the install execute sequence (33), the install processing can be discontinued when the communication between the mobile terminal (1-*j*) and the information processing server (2) is interrupted, while the install processing, once discontinued, can be re-initiated when the communication between the mobile terminal (1-*j*) and the information processing server (2) is again possible).

The mobile terminal (1-*j*) according to the present invention further comprises a conversion unit (14) for converting each object of the updated object group (4-4 to 4-13) into a program code, which is a form of using each updated object (4-4 to 4-13) on the mobile terminal (1-*j*), in executing each object of the updated object group installed on the terminal storage device (10, 16).

In the terminal storage device (10, 16), there is stored the set-up program code (7-4 to 7-13) associated with the updated object group (4-4 to 4-13).

The management unit (15) forms the malfunction group (41), representing each updated object (4-11 to 4-13), where the malfunction has occurred, based on the results of collation between the program code and the set-up program code (7-4 to 7-13).

The communication unit (12, 19) sends the malfunction group (41) to the information processing server (2).

Each updated object, suffering from the malfunction, is e.g. the object of selection (4-11 to 4-13) installed in the terminal storage device (10, 16). In this case, the malfunction report (41) represents the objects of selection (4-11 to 4-13). In the mobile terminal (1-*j*) of the present invention, the development of the objects (4-1 to 4-*m*) and the set-up program codes (7-1 to 7-*m*) by the manager of the information processing server (2) can be supported based on the malfunction report (41).

In the mobile terminal (1-*j*) according to the present invention, set-up program codes (7-1 to 7-*m*), associated with the plural objects (4-1 to 4-*m*), are stored in the server storage device (20, 26).

When the set-up program codes (7-1 to 7-*m*), stored in the server storage device (20, 26), are updated to the latest set-up program codes (7-1 to 7-*m*), the information processing server (2) refers to the list of state of use of the objects to transmit the latest set-up program code (7-4 to 7-13) associated with each of the objects of the updated object group (4-4 to 4-13), among the plural objects (4-1 to 4-*m*) stored in the server storage device (20, 26), to the mobile terminal (1-*j*).

The controller (11) updates the set-up program code (7-4 to 7-13) stored in the terminal storage device (10, 16) to the latest set-up program code (7-4 to 7-13).

In the mobile terminal (1-*j*) according to the present invention, the terminal identification information (8-*j*) as well as the unique information (5-11 to 5-13) and the URL (6-11 to 6-13) of each of the updated objects (4-11 to 4-13) where the malfunction has occurred is stated by the management unit (15) in the malfunction report (41). The information processing server (2) stores the malfunction report (41) in the server storage device (20, 26).

In the mobile terminal (1-*j*) according to the present invention, the set-up program code (7-1 to 7-*m*) is a program code where the malfunction occurs. The mobile terminal sends the malfunction report to the information processing server in case of coincidence of the program code and the set-up program code on collation by the management unit (15) of the program code and the set-up program code (7-4 to 7-13).

In the mobile terminal (1-*j*) according to the present invention, the malfunction report (41) is contained in the recovery request (40).

An information processing server (2) according to the present invention is connected to a mobile terminal (1-*j*; 1, 2, 3, . . . , n) over a network (3). The information processing server (2) according to the present invention includes a server storage device (20, 26) having stored therein a plurality of objects (4-1 to 4-*m*), a server communication unit (22, 29) and a server management unit (25). Each of the objects (4-1 to 4-*m*) includes the unique information (5-1 to 5-*m*) and the URL (6-1 to 6-*m*) for accessing to the information processing server for updating;

The server communication unit (22, 29) receives an install request (30) from the mobile terminal (1-*j*). The install request (30) includes an install list (31) having stated therein the unique information (5-11) and the URL (6-11) of a needed object (4-11), among the plural objects (4-1 to 4-*m*), that is necessary for installation.

The server management unit (25) refers to the install list (31) for selecting an object (4-11 to 4-13) for transmission from the plural objects (4-1 to 4-*m*) stored in the server storage device (20, 26).

The server communication unit (22, 29) transmits the selected object (4-11 to 4-13) to the mobile terminal (1-*j*). The selected object (4-11 to 4-13) is sometimes referred to as objects of selection (4-11 to 4-13).

The user of the mobile terminal (1-*j*) uses the mobile terminal (1-*j*) to select the unique information (5-11) and the URL (6-11) of the needed object (4-11), as an object actually employed, using the mobile terminal (1-*j*). Thus, with the information processing server (2) of the present invention, there is no necessity of sending the download menu (install menu) to the terminal, under a request from the terminal, as in a conventional server, but the object employed by the user is sent by the unique information (5-11) and the URL (6-11) of the needed object (4-11). Thus, with the information processing server (2) of the present invention, the object to be employed by the user can be acquired promptly.

In the information processing server (2) according to the present invention, the group of objects (4-1 to 4-*m*) among the plural objects (4-1 to 4-*m*) are installed in the terminal storage device (10, 16) of the mobile terminal (1-*j*).

The install request (30) further includes an installed list (32) having stated the unique information (5-1 to 5-10) and the URL (6-1 to 6-10) of the object group (4-1 to 4-10).

The server management unit (25) refers to the installed list (32) to form a list of unneeded objects (34) having stated the unique information (5-1 to 5-3) and the URL (6-1 to 6-3) of unneeded objects (4-1 to 4-3), that is, objects which become unnecessary when the selected objects (4-11 to 4-13) of the group of objects (4-1 to 4-10) are installed in the terminal storage device (10, 16).

The server communication unit (22, 29) transmits the list (34) of unneeded objects along with the selected object (4-11 to 4-13) to the mobile terminal (1-*j*).

Thus, in the information processing server (2) of the present invention, the unneeded objects (4-1 to 4-3), that is, the objects which become unnecessary when the selected objects (4-11 to 4-13) are installed by the mobile terminal (1-*j*) in the terminal storage device (10, 16), are deleted. Thus, with the information processing server (2) of the present invention, there is no necessity for the user to search and delete the unneeded objects (4-1 to 4-3), such that the user is able to use the updated group of objects (4-4 to 4-13) installed (updated) in the terminal storage device (10, 16), without confusion).

The information processing server (2) according to the present invention is connected to a mobile terminal (1-*j*; 1, 2, 3, ..., n) over a network (3). The mobile terminal (1-*j*) includes the terminal storage device (10, 16), in which there are installed a group of objects (4-1 to 4-10) among the plural objects (4-1 to 4-*m*). The information processing server (2) according to the present invention includes the server storage device (20, 26), having stored therein the plural objects (4-1 to 4-*m*), the server communication unit (22, 29) and the server management unit (25).

The server communication unit (22, 29) receives an install request (30) from the mobile terminal (1-*j*). The install request (30) includes an install list (31) and an installed list (32). The install list represents a needed object (4-11) among the plural objects that is necessary for installation and the installed list represents the group of objects (4-1 to 4-10) installed in the terminal storage device (10, 16).

The server management unit (25) refers to the install list (31) to select an object for transmission (4-11 to 4-13) from the plural objects (4-1 to 4-*m*) stored in the server storage device (20, 26). The server management unit (25) also refers to the installed list (32) to form a list (34) of unneeded objects (4-1 to 4-3), among the objects (4-1 to 4-10) of the group of objects, that is, objects which become unnecessary when the selected objects (4-11 to 4-13) are installed on the terminal storage device (10, 16).

The server communication unit (22, 29) sends the selected object (4-11 to 4-13) and the list of unneeded objects (34) to the mobile terminal (1-*j*).

Thus, in the information processing server (2) of the present invention, the unneeded objects (4-1 to 4-3), that is, the objects which become unnecessary when the selected objects (4-11 to 4-13) are installed in the terminal storage device (10, 16), are deleted. Thus, with the information processing server (2) of the present invention, there is no necessity for the user to search and delete the unneeded objects (4-1 to 4-3), such that the user is able to use the updated group of objects (4-4 to 4-13) installed (updated) in the terminal storage device (10, 16), without confusion).

In the information processing server (2) according to the present invention, each of the plural objects (4-1 to 4-*m*) includes the unique information (5-1 to 5-*m*) and the URL (6-1 to 6-*m*).

The install list (31) has stated therein the unique information (5-11) and the URL (6-11) of the needed object (4-11) by the mobile terminal (1-*j*). The installed list (32) has stated therein the unique information (5-1 to 5-10) and the URL (6-1 to 6-10) of the object group (4-1 to 4-10) by the mobile terminal (1-*j*). The list of unneeded objects (34) has stated therein the unique information (5-1 to 5-3) and the URL (6-1 to 6-3) of the unneeded objects (4-1 to 4-3) by the server management unit (25).

The user of the mobile terminal (1-*j*) uses the mobile terminal (1-*j*) to select the unique information (5-11) and the URL (6-11) of the needed object (4-11) which is an object actually desired to be used. Thus, with the information processing server (2) of the present invention, there is no necessity of sending the download menu (install menu) to the terminal, under a request from the terminal, as in a conventional server, but the object employed by the user is sent by the unique information (5-11) and the URL (6-11) of the needed object (4-11). Thus, with the information processing server (2) of the present invention, the object to be employed by the user can be acquired promptly.

In the information processing server (2) according to the present invention, the selected object (4-11 to 4-13) is installed by the mobile terminal (1-*j*) in the terminal storage device (10, 16). The mobile terminal refers to the list of unneeded objects so that the unneeded objects (4-11 to 4-13) among the objects (4-4 to 4-10) of the object group are deleted by the mobile terminal (1-*j*).

The selected object (4-11 to 4-13) and the object group (4-4 to 4-10) having the unneeded object (4-1 to 4-3) deleted are stored in the terminal storage device (10, 16) as an updated object group (4-4 to 4-13).

In the information processing server (2) according to the present invention, the install request (30) further includes the terminal identification information (8-*j*) for discriminating the mobile terminal (1-*j*).

The server management unit (25) forms a list of state of use of the objects (35), responsive to the install request (30), to store the list in the server storage device (20, 26).

The list of state of use of the objects (35) has stated therein the terminal identification information (8-*j*), the unique information (5-1 to 5-3) and the URL (6-1 to 6-3) of the unneeded object (4-1 to 4-3), presently deleted, the unique information (5-4 to 5-10) and the URL (6-4 to 6-10) of the group of objects (4-4 to 4-10), having the unneeded object (4-1 to 4-3) deleted, and the unique information (5-11 to 5-13) and the URL (6-11 to 6-13) of the presently newly installed selected objects (4-11 to 4-13), by the information processing server (2).

Thus, in the information processing server (2) according to the present invention, in which the information processing server (2) forms the list of state of use of the objects (35) to store the so formed list in the server storage device (20, 26), so that the updated object group (4-4 to 4-13) installed in the mobile terminal (1-*j*) can be grasped by the information processing server (2).

In the information processing server (2) according to the present invention, the server communication unit (22, 29) receives, from the mobile terminal (1-*j*), a recovery request (40), which is the install request for restoring the updated object group (4-4 to 4-13) installed in the terminal storage device (10, 16) to the object group (4-1 to 4-10).

The recovery request (40) is the information sent by the mobile terminal (1-*j*) when a malfunction has occurred in executing each object of the updated object group (4-4 to 4-13), installed in the terminal storage device (10, 16), by the mobile terminal (1-*j*). The recovery request (40) includes a recovery request list (42) having stated therein by the mobile terminal (1-*j*) the terminal identification information (8-*j*) and the unique information (5-4 to 5-13) and the URL (6-4 to 6-13) of the updated object group (4-4 to 4-13) installed in the terminal storage device (10, 16).

The server management unit (25) refers to the recovery request list (42) and the list of state of use of the objects (35), stored in the server storage device (20, 26), to select from the plural objects (4-1 to 4-*m*) stored in the server storage device (20, 26) the unneeded objects (4-1 to 4-3) to be installed by the mobile terminal (1-*j*) in the terminal storage device (10, 16). The server management unit (25) forms a list of unneeded restoration objects (44) stating the unique information (5-11 to 5-13) and the URL (6-11 to 6-13) of the selected object (4-11 to 4-13) which become unnecessary when the unneeded object(4-1 to 4-3) among the objects of the updated object group (4-4 to 4-13) are installed on the terminal storage device (10, 16).

The server communication unit (22, 29) sends the list of unneeded objects (44) along with the unneeded objects (4-1 to 4-3) to the mobile terminal (1-*j*).

In the information processing server (2) according to the present invention, described above, the information processing server (2) comprehends the updated object group (4-4 to 4-13) installed in the mobile terminal (1-*u*). Thus, if a malfunction has occurred in executing the selected objects (4-11 to 4-13) installed in the terminal storage device (10, 16), that is, if a malfunction has occurred due to installing the objects of selection (4-11 to 4-13), the updated object group (4-4 to 4-13) installed in the terminal storage device (10, 16) can be restored to the original state, that is, to the object group (4-1 to 4-10).

In the information processing server (2) according to the present invention, the server management unit (25) refers to the install list (31) to select the needed object (4-11) from the plural objects (4-1 to 4-*m*) stored in the server storage device (20, 26). The server management unit (25) also refers to the installed list (32) to select from the plural objects (4-1 to 4-*m*) stored in the server storage device (20, 26) the link objects (4-12, 4-13) containing the unique information (5-12, 5-13) and the URL (6-12, 6-13), which link objects are linked to the needed object (4-11) and not stated in the installed list (32).

The server communication unit (22, 29) sends the needed object (4-11) and the link object (4-12, 4-13) as the selected object (4-11 to 4-13) to the mobile terminal (1-*j*).

Thus, in the information processing server (2) according to the present invention, the link object (4-12, 4-13), linked to the needed object (4-11), selected by the user of the mobile terminal (1-*j*), may also be promptly acquired as objects used by the user, by the unique information (5-11) and the URL (6-11) of the needed object (4-11) as selected by the user of the mobile terminal (1-*j*).

In the information processing server (2) according to the present invention, the server management unit (25) forms an install execute sequence (33) for installing the needed object (4-11) and the link object (4-12, 4-13) in a preset sequence.

In the information processing server (2) according to the present invention, the server communication unit (22, 29) sends the needed object (4-11) and the link object (4-12, 4-13) in a preset sequence to the mobile terminal (1-*j*).

In the information processing server (2) according to the present invention, the communication between the mobile terminal (1-*j*) and the server communication unit (22, 29) is interrupted from time to time during the install processing as from transmission of the install request (30, 40) from the mobile terminal (1-*j*) to the server communication unit (22, 29) until the object from the server communication unit (22, 29) is installed in the terminal storage device (10, 16). In such case, the server communication unit (22, 29) discontinues the install processing in accordance with the install execute sequence (33).

Subsequently, the communication between the mobile terminal (1-*j*) and the server communication unit (22, 29) is possible. In such case, the server communication unit (22, 29) receives from the mobile terminal (1-*j*) an installation re-initiation request (35) for re-initiating the installation processing, once discontinued, in accordance with the install execute sequence (33).

Thus, in the information processing server (2) according to the present invention, in which the needed object (4-11) and the link object (4-12, 4-13) are sent in a preset sequence to the mobile terminal (1-*j*), in accordance with the install execute sequence (33), the install processing can be discontinued when the communication between the mobile terminal (1-*j*) and the server communication unit (2) is interrupted, while the install processing, once discontinued, can be re-initiated, in accordance with the install execute sequence (33), when the communication between the mobile terminal (1-*j*) and the server communication unit (2) is possible.

In the information processing server (2) according to the present invention, the terminal storage device (10, 16) has stored therein a setup program code (7-4 to 7-13) associated with each of the objects of the updated object group (4-4 to 4-13).

The server communication unit (22, 29) receives a malfunction report (41) from the mobile terminal (1-*j*).

The malfunction report is the information sent from the mobile terminal (1-*j*) based on the result of collation between the set-up program code (7-4 to 7-13) and the program code converted by the mobile terminal (1-*j*) into a form of use on the mobile terminal (1-*j*) from each updated object (4-4 to 4-13) when each updated object (4-4 to 4-13) of the updated object group installed on the terminal storage device is executed by the mobile terminal (1-*j*). The malfunction report (41) represents each updated object (4-11 to 4-13) suffering from the malfunction.

It is assumed that the objects, where the malfunction has occurred, are the objects of selection (4-11 to 4-13), installed on the terminal storage device (10, 16). The malfunction report (41) is relevant to the objects of selection (4-11 to 4-13). In the information processing server (2) of the present invention, development of the objects (4-1 to 4-*m*) and the set-up program codes (7-1 to 7-*m*) by the manager of the information processing server (2) may be supported based on this malfunction report (41).

In the information processing server (2) according to the present invention, the server storage device (20, 26) has stored therein the setup program codes (7-1 to 7-*m*) associated with the plural objects (4-1 to 4-*m*).

When the set-up program codes (7-1 to 7-*m*) stored in the server storage device is updated to the latest set-up program codes (7-1 to 7-*m*), the server management unit (25) refers to the list of state of use of the objects (35) to select the latest set-up program code associated with each of the objects of the updated object group (4-4 to 4-13) among the plural objects (4-1 to 4-*m*) stored in the server storage device (20, 26). The server communication unit (22, 29) sends the latest set-up program code (7-4 to 7-13) to the mobile terminal (1-*j*).

The set-up program codes (7-4 to 7-13) stored in the terminal storage device (10, 16) are updated to the latest set-up program codes (7-4 to 7-13).

In the information processing server (2) according to the present invention, the malfunction report has stated therein the terminal identification information (8-*j*), the unique information (5-11 to 5-13) and the URL (6-11 to 6-13) of the updated object (4-11 to 4-13) suffering from the malfunction, by the mobile terminal (1-*j*). The server management unit (25) stores the malfunction report (41) in the server storage device (20, 26).

In the information processing server (2) according to the present invention, the set-up program codes (7-1 to 7-*m*) are program codes where the malfunction occurs. The malfunction report (41) is sent by the mobile terminal (1-*j*) when the program code coincides with the set-up program code (7-4 to 7-13).

In the information processing server (2) according to the present invention, the malfunction report (41) is included in the recovery request (40).

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 4 shows the information stored in a database 26 of the information processing server 2 in the information processing system according to the present invention.

FIG. 8 shows the information stored in a database 17 of the mobile terminal 1-$j$ in the information processing system according to the present invention.

FIG. 11 shows an installed list 32 in the information processing system according to the present invention.

FIG. 12 shows a list of unneeded restoration objects 34 in the information processing system according to the present invention.

FIG. 13 shows an install execute sequence 33 in the information processing system according to the present invention.

FIG. 16 shows a list indicating the state of use of the objects 35 in the information processing system according to the present invention.

FIG. 21 shows a malfunction report 41 of the information processing system of the present invention.

FIG. 22 shows a recovery request list 42 of the information processing system of the present invention.

FIG. 23 shows a list of unneeded restoration objects 44 of the information processing system of the present invention.

FIG. 25 shows a list of state of use of the objects 45 of the information processing system of the present invention.

PREFERRED EMBODIMENTS OF THE INVENTION

Figure 1:
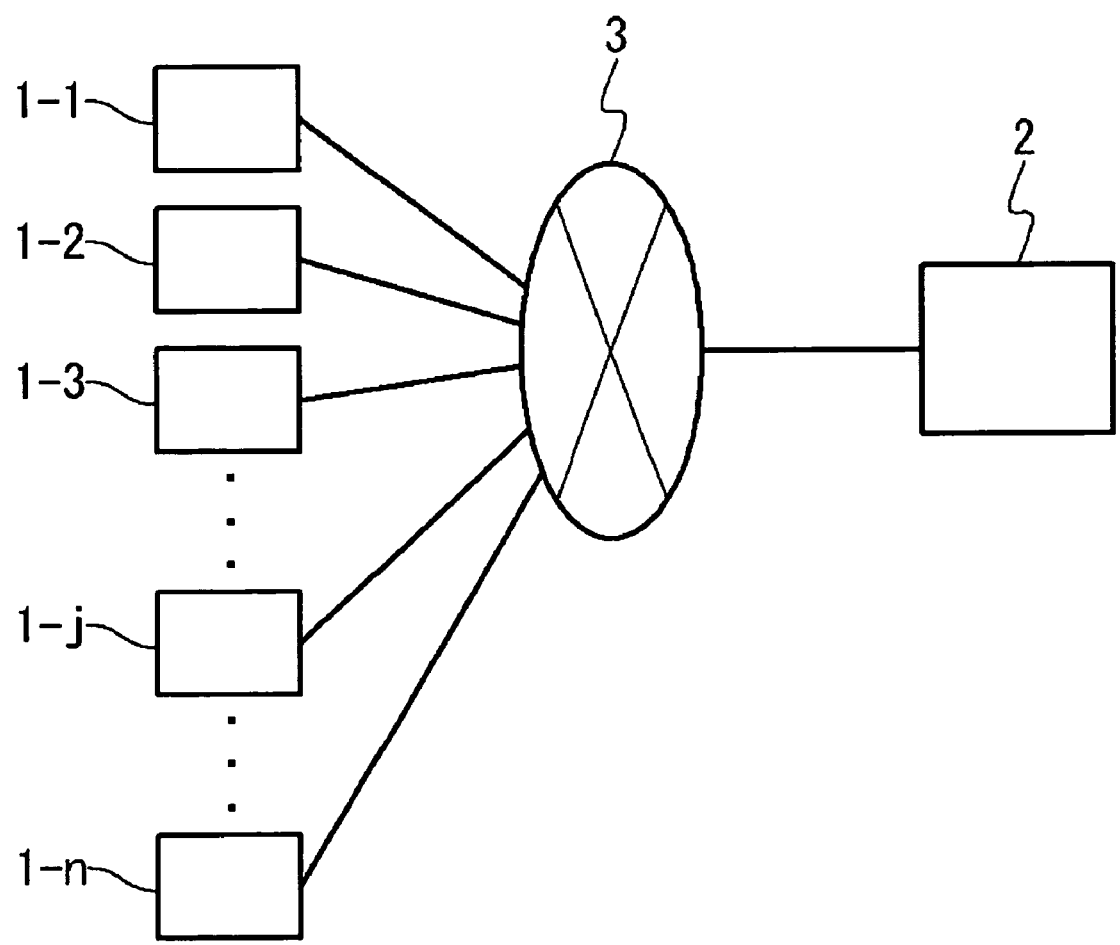
FIG. 1 shows the configuration of an information processing system of the present invention.

Referring to the drawings, preferred embodiments of the present invention are now described. FIG. 1 depicts the configuration of an information processing system according to an embodiment of the present invention. Referring to FIG. 1, the information processing system according to an embodiment of the present invention includes mobile terminals 1-1 to 1-$n$, where n is an integer not less than 1, and an information processing server 2. As the mobile terminal 1-$j$, a mobile phone or a PDA (personal digital assistant) may b be adopted. The mobile terminal 1-$j$, where j=1, 2, 3, . . . , n, and the information processing server 2, are connected to a network 3.

The mobile terminal 1-$j$ transmits an install request, which is later described, as the information for installing the object as needed by the user of the mobile terminal 1-$j$ (computer programs, and/or information) over the network 3 to the information processing server 2. This information processing server 2 is responsive to the install request, as later explained, to transmit the object as needed by the user and the relevant information, as later explained, over the network 3 to the mobile terminal 1-$j$.

Figure 2:
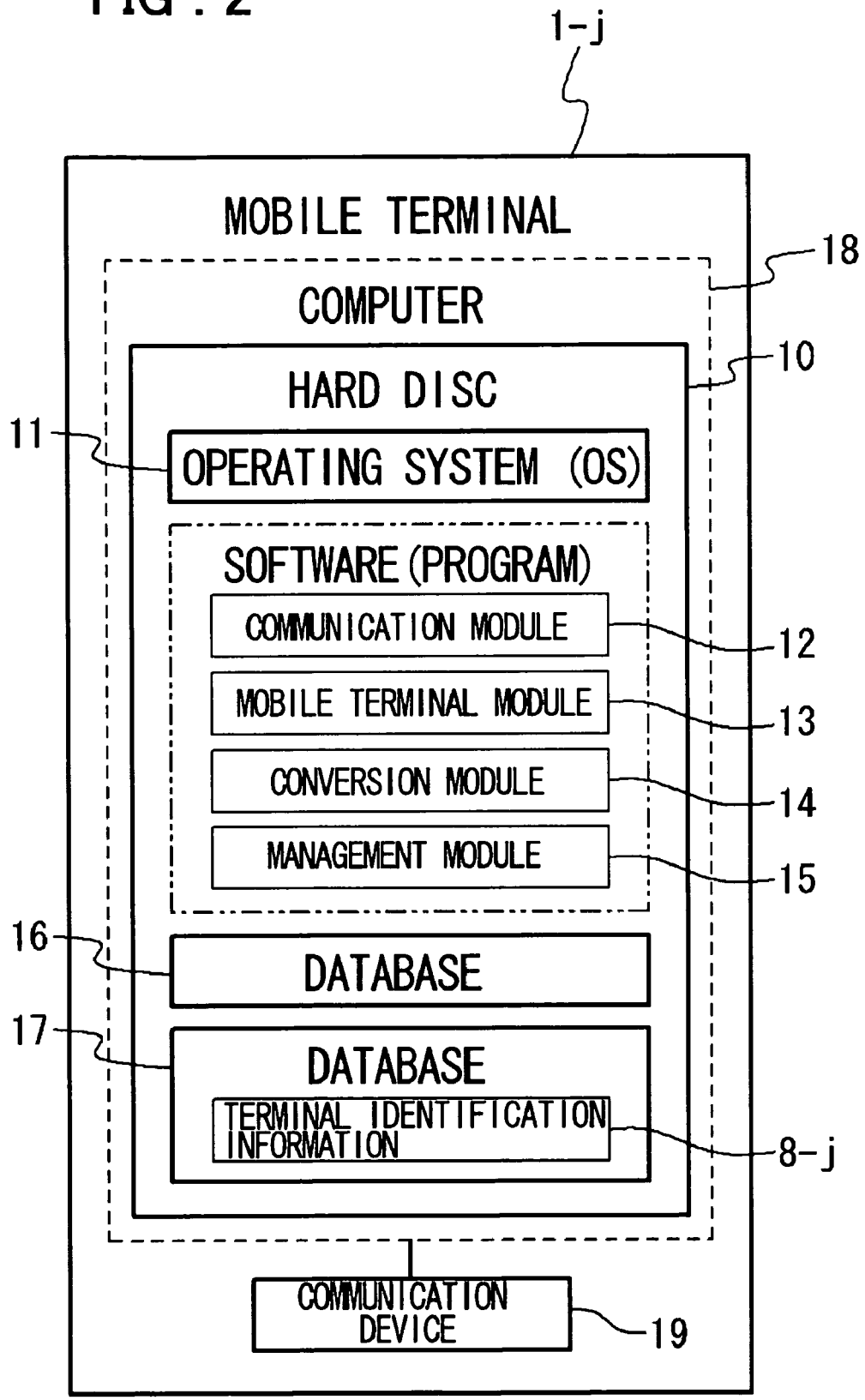
FIG. 2 shows the configuration of a mobile terminal 1-$j$ in the information processing system according to the present invention.

FIG. 2 shows the configuration of the mobile terminal 1-$j$. The mobile terminal 1-$j$ includes a computer 18. To this computer 18 are connected a communication device 19, an input device, not shown, and a display device, also not shown. The computer 18 includes a hard disc 10, as a memory device for the mobile terminal 1-$j$.

In the hard disc 10, there are stored an operating system (OS) 11, a database 16 and a database 17, as a platform environment in the mobile terminal 1-$j$. In the database 16, a set of objects, as later explained, among the plural objects, as later explained, are installed (stored). Each of the plural objects includes the unique information (version and magic numbers), and the URL (Uniform Resource Locator) as an address with which the mobile terminal 1-$j$ accesses the information processing server 2 for updating. In the database 16, there is stored a program pattern (set-up program code) associated with each of the objects of the object group. The set-up program code is a program code in which, when each of the objects of the object group installed in the database 16 is executed, a malfunction occurs. In the database 17, there is stored the terminal identification information 8-$j$ for discriminating the mobile terminal 1-$j$.

In the hard disc 10, there are additionally stored a communication module 12, as the software (computer program), a mobile terminal module 13, a conversion module 14 and a management module 15. The communication module 12, mobile terminal module 13, conversion module 14 and the management module 15 are resident at all times in the OS 11 and automatically run by the OS 11.

The communication module 12 has the communication functions employing the HTTP (Hyper Text Transfer Protocol), TCP/IP (Transmission Control Protocol/Internet Protocol), Bluetooth and infrared rays. One of the transmission protocols employing the HTTP, TCP/IP, Bluetooth and infrared rays, is selected by the user acting on an input device of the mobile terminal 1-*j*. Based on the communication function, thus selected, the communication module 12 controls the communication device 19 so that exchange of the information for installing the object as needed by the user will take place between the mobile terminal and the information processing server 2.

The mobile terminal module 13 performs usual operations of a mobile phone or the PDA. In case the mobile terminal 1-*j* is a mobile phone, the usual operation is the operations of call or exchange of E-mails with the mobile terminals 1-2 to 1-*m*. The mobile terminal module 13 of the mobile terminal 1-*j*, which in this case is the mobile phone 1-1, controls the communication device 19 so that call and exchange of E-mails will take place between the mobile terminal 1-*j* and the mobile terminals 1-2 to 1-*m*).

In executing each of the objects of the group of objects, installed on the hard disc 10 (database 16), the conversion module 14 converts each object into a program that may be run on the mobile terminal 1-*j* (program code).

The management module 15 manages the group of the objects, installed on the hard disc 10 (database 16), and comprehends the state of storage of the object group. When the program code converted by the conversion module 14 and the set-up program code stored in the database 16 (program code in which a malfunction may occur) are not coincident with each other, the management module 15 executes each object.

The plural objects are programs written in a programming language that may be converted by the conversion module 14, as described above. Since the plural objects are converted by the conversion module 14 into a program adapted to the platform, the objects can be run in an environment provided with the conversion module 14 without dependency on the platform.

Figure 3:
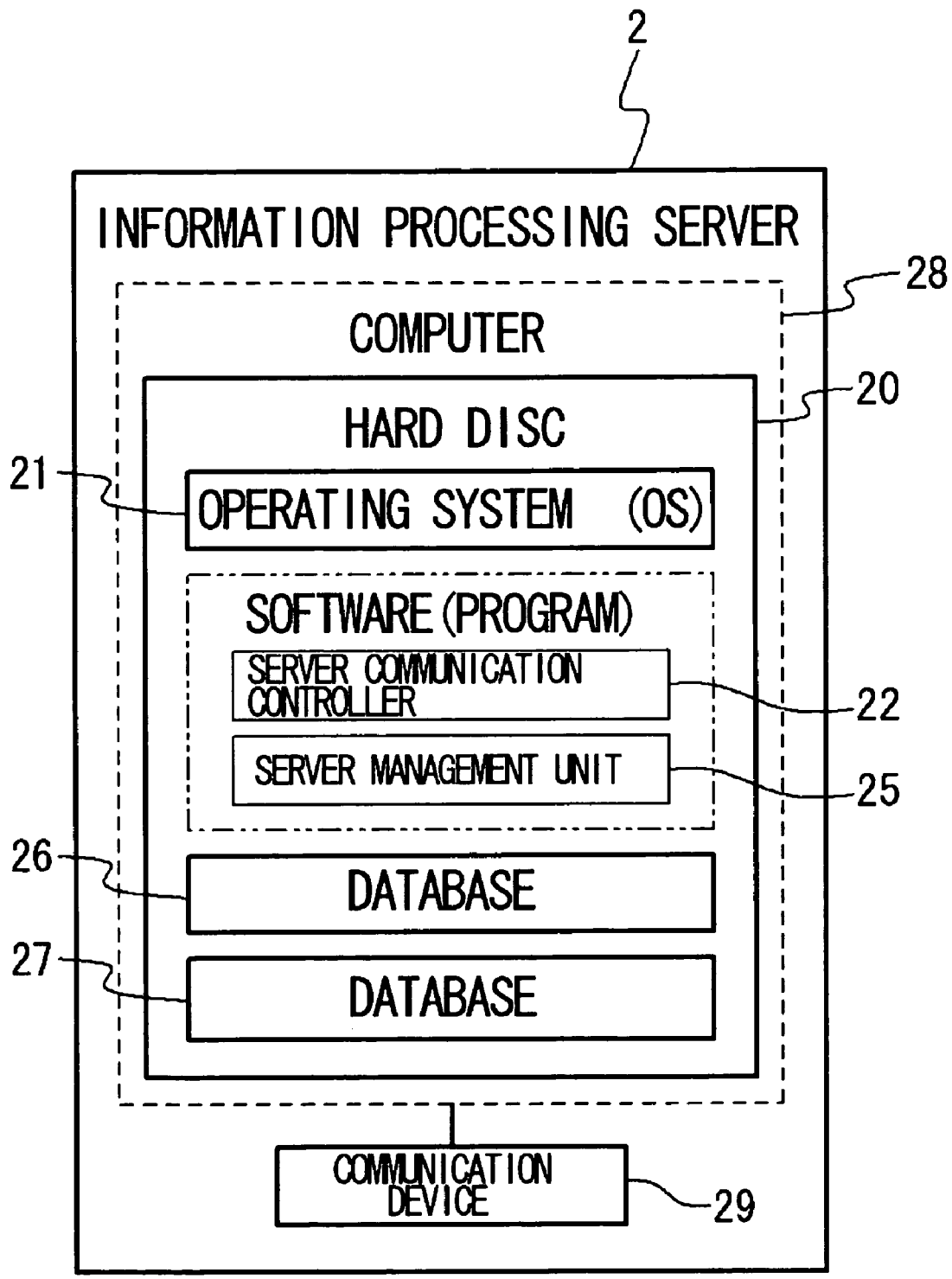
FIG. 3 shows the configuration of an information processing server 2 in the information processing system according to the present invention.

FIG. 3 shows the configuration of the information processing server 2. This information processing server 2 includes a computer 28. To this computer 28 are connected a communication device 29, an input device, not shown, and a display device, also not shown. The computer 18 includes a hard disc 20, as a memory device for the information processing server 2).

In the hard disc 20, there are stored an operating system (OS) 21, a database 26 and a database 27, as a platform environment in the information processing server 2. In the database 26, plural objects, as later explained, are stored. In the database 26, a program pattern, associated with each of plural objects (set-up program code), is stored. In the database 27, there is stored a list of the state of use of the objects, stored in the hard disc 10 of the mobile terminal 1-*j*, as later explained.

In the hard disc 20, there are further stored a server communication controller 22 and a server management unit 25, which are software (computer programs). The server communication controller 22 and a server management unit 25 are resident at all times in the OS 21 and automatically executed by the OS 21.

The server communication controller 22 has the communication function employing HTTP, TCP/IP, Bluetooth or infrared rays. The server communication controller 22 controls the communication device 29 so that information exchange will be executed between the server 2 and the mobile terminal 1-*j* in keeping with the communication function as selected by the user (mobile terminal 1-*j*). The server management unit 25 supervises the plural objects stored in the hard disc 20 (database 26) to comprehend the state of storage of the plural objects.

FIG. 4 shows the information stored in the database 26 of the information processing server 2. In the database 26, there are stored, as the aforementioned plural objects, the objects 4-1 to 4-*m*, where m is an integer not less than 1. The objects 4-1 to 4-*m* include, as the aforementioned unique information and the aforementioned URL, the unique information 5-1 to 5-*m* and the URL 6-1 to 6-*m*. In the database 26, there are additionally stored, as the aforementioned set-up program code, set-up program codes 7-1 to 7-*m*, which are associated with the objects 4-1 to 4-*m*, respectively.

Figure 5:
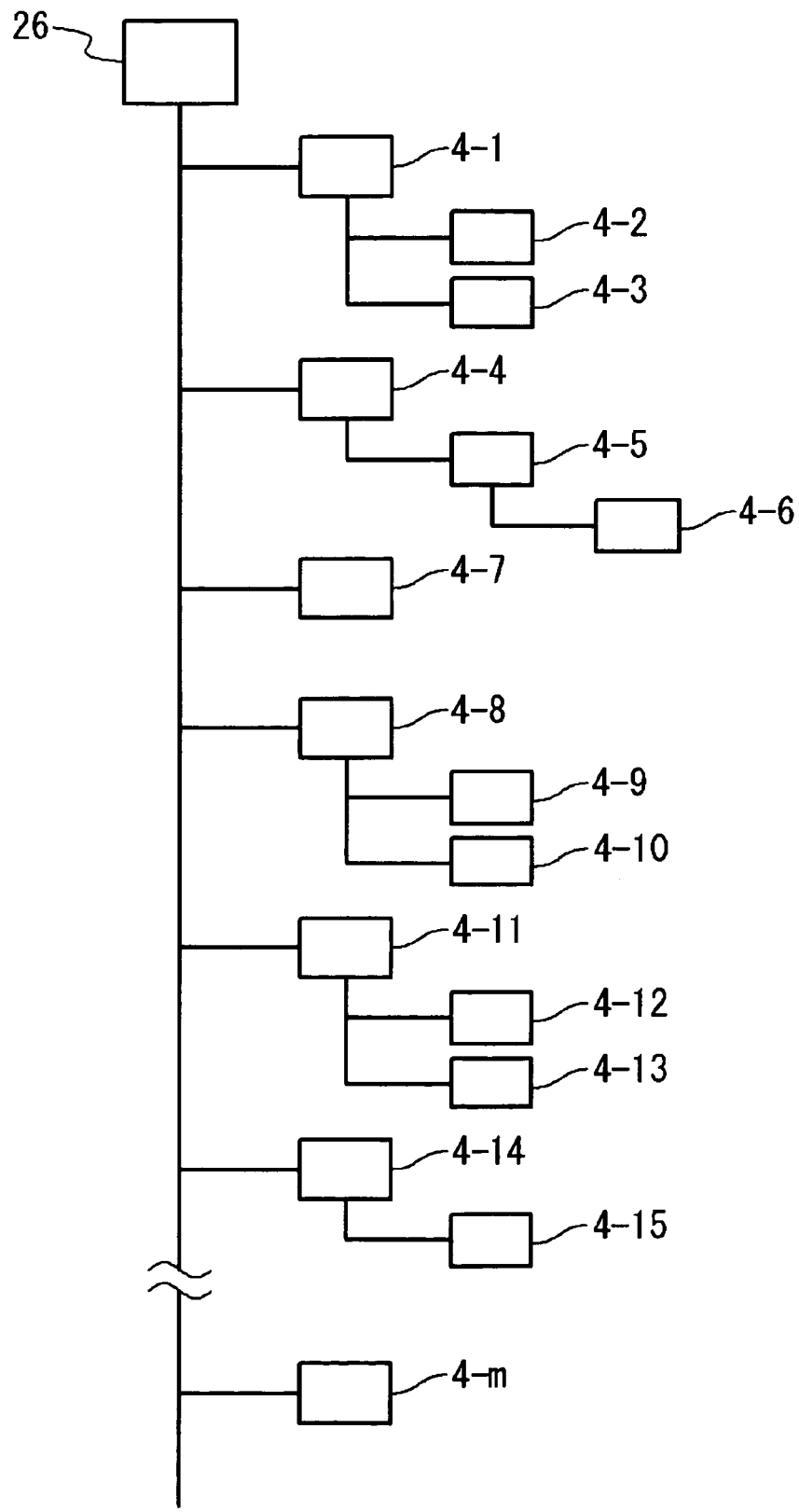
FIG. 5 shows the concept of objects 4-1 to 4-15 of the plural objects 4-1 to 4-1$m$ stored in the database 26 of the information processing server 2 in the present embodiment).

FIG. 5 shows the concept of objects 4-1 to 4-15, among the plural objects (objects 4-1 to 4-*m*) stored in the hard disc 20 of the information processing server 2 (database 26). Of the objects 4-1 to 4-15, stored in the database 26, the objects 4-2 and 4-3 are linked to the object 4-1, the object 4-5 is linked to the object 4-4, the object 4-6 is linked to the object 4-5, the objects 4-9 and 4-10 are linked to the object 4-8, the objects 4-12 and 4-13 are linked to the object 4-11 and the object 4-15 is linked to the object 4-11.

Figure 6:
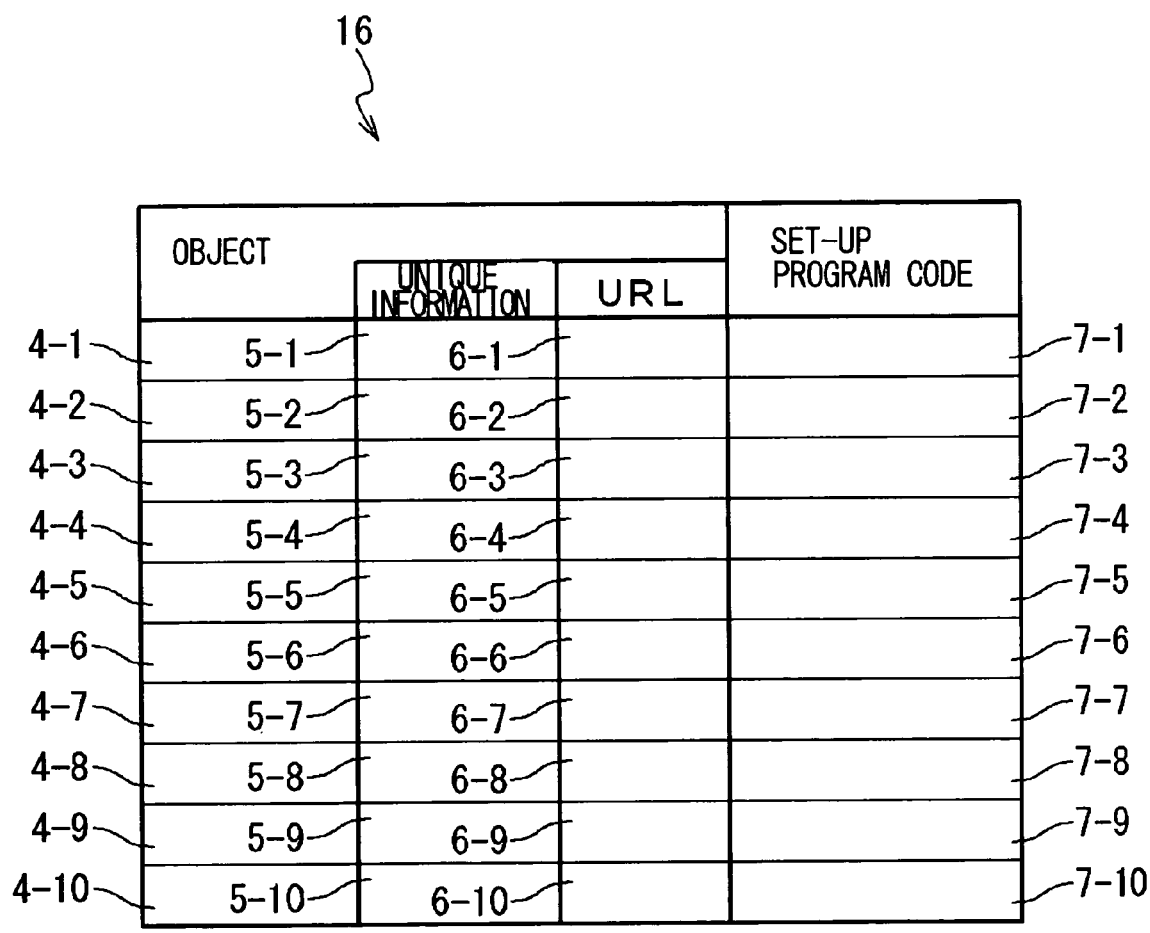
FIG. 6 shows the information stored in the database 16 of the mobile terminal 1-$j$ in the information processing system according to the present invention.

FIG. 6 shows the information stored in the database 16 of the mobile terminal 1-*j*. It is assumed that, in the database 16, there are already installed (stored) the objects 4-1 to 4-10, as the aforementioned objects of the group of objects, among the objects 4-1 to 4-*m*. As aforesaid, the objects 4-1 to 4-10 include the unique information 5-1 to 5-10 and URL 6-1 to 6-10, while there are further stored in the database 16 the set-up program codes 7-1 to 7-10 associated with the objects 4-1 to 4-10.

Figure 7:
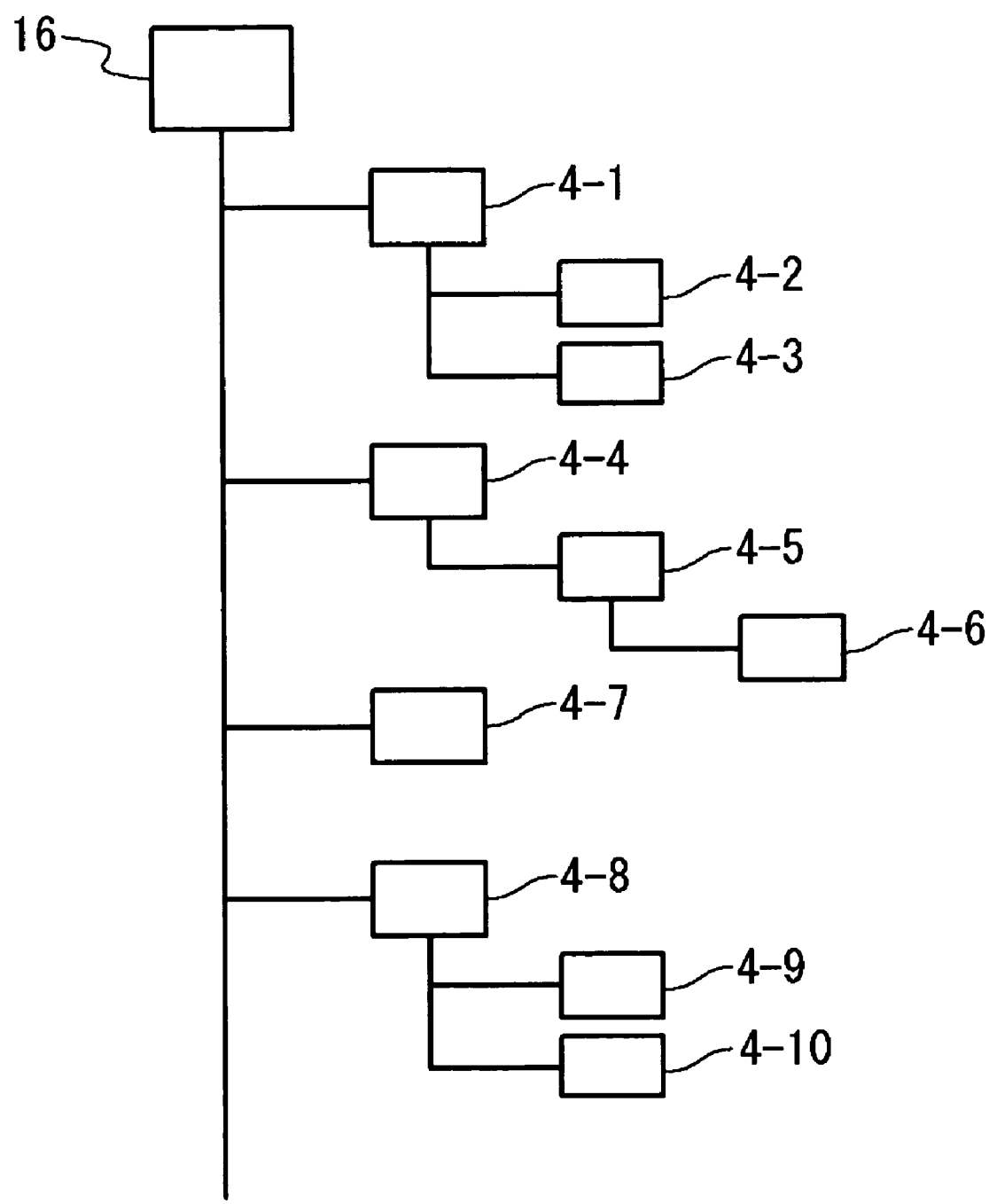
FIG. 7 shows the concept of a group of objects 4-1 to 4-10 stored in the database 16 of the mobile terminal 1-$j$ in an embodiment of present invention.

FIG. 7 shows the concept of the sets of objects (objects 4-1 to 4-10) stored in the hard disc 10 of the mobile terminal 1-*j* (database 16). Of the objects 4-1 to 4-10, the objects 4-2 and 4-3 are linked to the object 4-1, the object 4-5 is linked to the object 4-4, the object 4-6 is linked to the object 4-5, and the objects 4-9 and 4-10 are linked to the object 4-8, as in the case of the objects 4-1 to 4-10 among the objects 4-1 to 4-*m* stored in the database 16.

FIG. 8 shows the information stored in the database 17 of the mobile terminal 1-*j*. In the database 17, there are stored, in addition to the terminal identification information 8-*j*, the unique information 5-1 to 5-*m* and the URL 6-1 to 6-*m*, in a relationship of correspondence, for selecting the objects, among the plural objects 4-1 to 4-*m*, as needed in installation. In the database 17, there is further stored the installation information, associated with the unique information 5-1 to 5-*m* and the URL 6-1 to 6-*m*, for indicating whether or not the objects have been installed. In the present embodiment, the information of the state of installation, that is 'installed', is stored in the database 17, in association with the unique information 5-1 to 5-10 and the URL 6-1 to 6-10.

When an object is added by a manager of the information processing server 2, the unique information 5-1 to 5-*m* and the URL 6-1 to 6-*m*, stored in the database 17, are updated to the latest unique information 5-1 to 5-*m* and the URL 6-1 to 6-*m* (in this case, m=m+1), by the information processing server 2. In this case, the server communication controller 22 of the information processing server 2 controls the communication device 29 so that the latest unique information 5-1 to 5-*m* and the URL 6-1 to 6-*m* will be sent to the mobile terminal 1-*j*. The OS 11 of the mobile terminal 1-*j* updates the unique information 5-1 to 5-*m* and the URL 6-1 to 6-*m*, stored in the hard disc 10 (database 17) to the latest unique information 5-1 to 5-*m* and URL 6-1 to 6-*m*.

The operation of the information processing system of the present invention is now explained. The operation of the information processing system of the present invention encompasses the install processing, processing of updating the set-up program code, the processing of object execution and the recovery processing. The install processing and the recovery processing are carried out by the software of the mobile terminal 1-*j* and the information processing server 2 (computer program).

The install processing is the processing as from transmission of the install request to the mobile terminal 1-*j* to the information processing server 2 until installing the object from the information processing server 2 to the hard disc 10 of the mobile terminal 1-*j*.

The processing of updating the set-up program code is the processing of updating the set-up program code (7-1 to 7-10) stored in the hard disc 10 to the latest set-up program code 7-1 to 7-10, by push distribution from the information processing server 2 (automatic transmission of the latest set-up program code from the information processing server 2) when the set-up program codes 7-1 to 7-10 stored in the hard disc 20 have been updated to the latest set-up program code 7-1 to 7-10.

The processing of object execution is the execution by the mobile terminal 1-*j* of each of the objects of the object group, installed on the hard disc 10 by the install processing (updated object group).

The recovery processing is the processing of restoring the updated object group, installed on the hard disc 10, to the former object group (objects 4-1 to 4-10) if malfunction has occurred in executing each of the objects of the object group installed on the hard disc 10 by the install processing (updated object group).

The computer program, responsible for the install processing and the recovery processing, includes a subroutine program for performing the installation re-initiation processing. If, during the install processing (recovery processing), the communication between the mobile terminal 1-*j* and the information processing server 2 has come to a close, the information processing server 2 discontinues the install processing (recovery processing). The installation re-initiation processing means the processing in which, in case the communication between the mobile terminal 1-*j* and the information processing server 2 is possible during the time of interruption of the install processing (recovery processing), the mobile terminal 1-*j* sends an installation re-initiation request, as later explained, to the information processing server 2, which information processing server 2 then is responsive to the installation re-initiation request to re-initiate the install processing (recovery processing).

Figure 9:
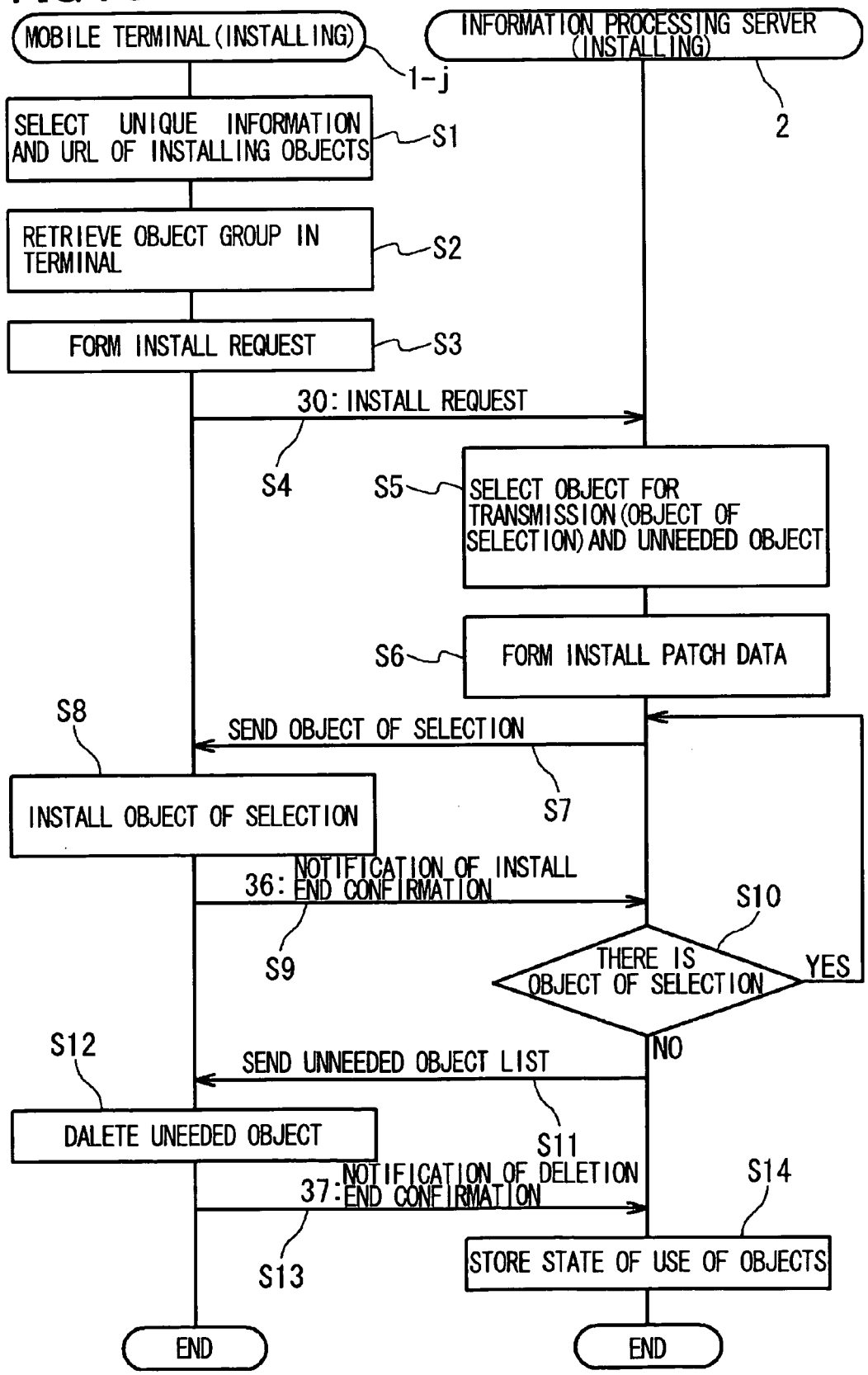
FIG. 9 shows an install processing as an operation of the information processing system of the present invention.

FIG. 9 shows the install processing, as an operation of the information processing system of the present invention.

The management module 15 of the mobile terminal i-*j* controls the display of the mobile terminal i-*j*, by the operation of the input device of the mobile terminal i-*j* by the user, so that the information 5-1 to 5-*m*, URL 6-1 to 6-*m* and the information on the installed state) will be displayed thereon. The user refers to the information displayed on the display device to select the unique information 5-11 and the URL 6-11 of the object 4-11 of the plural objects 4-1 to 4-11 which is necessary for installation (step S1).

Figure 10:
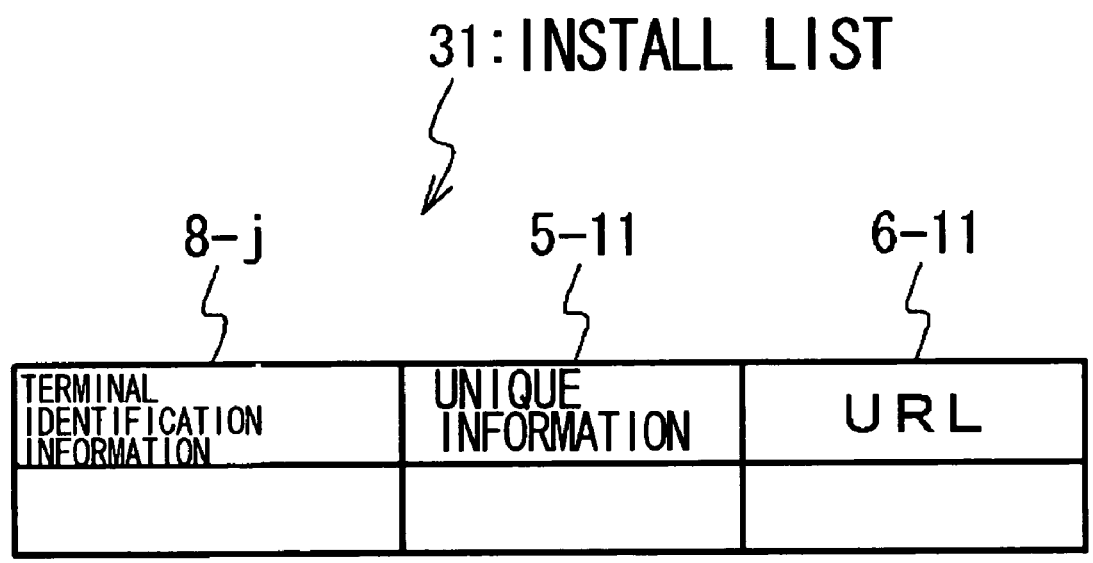
FIG. 10 shows an install list 31 in the information processing system according to the present invention.

When the unique information 5-11 and the URL 6-11 of the object 4-11 as needed have been selected in the step S1, the management module 15 forms an install list 31 shown in FIG. 10. The install list 31 represents the needed object 4-11, which has been selected by the user. In this install list 31, the terminal identification information 8-*j*, as well as the unique information 5-11 and the URL 6-11 of the necessary object 4-11, is stated by the management module 15. The user acts on the input device of the mobile terminal 1-*j*, on selection of the object 4-11 as needed in the step S1, to select one of the communication functions employing the HTTP, TCP/IP, Bluetooth and the infrared rays.

The management module 15 of the mobile terminal 1-*j* retrieves the objects 4-1 to 4-10, installed on the hard disc 10 (database 16) (step S2).

On retrieval of the object group of the objects 4-1 to 4-10 in the step S2, the management module 15 forms an installed list 32 shown in FIG. 11. The installed list 32 represents the object group of the objects 4-1 to 4-10 as installed on the hard disc 10 (database 16). This installed list 32 includes the unique information 5-1 to 5-10 and the URL 6-1 to 6-10, as stated by the management module 15).

The management module 15 of the mobile terminal 1-*j* forms an install request 30, including the install list 31 and the installed list 32 (step S3). The communication module 12 of the mobile terminal 1-*j* controls the communication device 19, so that the install request 30 will be sent to the information processing server 2, based on the communication function as selected by the user (step S4).

The server communication controller 22 of the information processing server 2 comprehends the communication function, as selected by the user on receipt of the install request 30 from the mobile terminal 1-*j*. The server management unit 25 is responsive to the install request 30 to select an object to be sent to the mobile terminal 1-*j* (object of selection as later explained) and an unneeded object (unneeded object as later explained), from among the plural objects 4-1 to 4-*m* stored in the hard disc 20 (database 26) (step S5).

The selection of the object to be transmitted in the step S5 is now explained.

The server management unit 25 of the information processing server 2 refers to the install list 31, included in the install request 30, to select the needed object 4-11, as the object of selection, from the plural objects 4-1 to 4-*m* stored in the hard disc 20 (database 26). Simultaneously, the server management unit 25 also selects the set-up program code 7-11, associated with the object of selection 4-11, from the plural set-up program codes 7-1 to 7-*m*, stored in the database 26.

The server management unit 25 refers to the installed list 32 in the install request 30 to select, from the plural objects 4-1 to 4-*m*, stored in the hard disc 20 (database 26), the link objects 4-12 and 4-13, linked to the needed object 4-11 and not stated in the installed list 32, as the objects of selection. Simultaneously, the server management unit 25 also selects the set-up program codes 7-12 and 7-13, associated with the objects of selection 4-12 and 4-13, from the plural set-up program codes 7-1 to 7-*m* stored in the database 26.

The selection of the unneeded object in the step S5 is now explained.

The server management unit 25 of the information processing server 2 refers to the installed list 32 in the install request 30 to form an unneeded object list 34 shown in FIG. 12. This unneeded object list 34 denotes unneeded objects 4-1 to 4-3 which, when the objects of selection 4-11 to 4-13 of the objects 4-1 to 4-10 of the object group are installed on the hard disc 10 (database 16), become unnecessary. In the unneeded object list 34, the terminal identification information 8-*j*, the unique information 5-1 to 5-3 and the URL 6-1 to 6-3, are stated by the server management unit 25.

The server management unit 25 of the information processing server 2 forms install patch data for compressing the objects of selection 4-11 to 4-13 for enabling the installation (step S6).

When the install patch data are prepared in the step S6, the server management unit 25 forms an install execute sequence 33 for the mobile terminal 1-*j* to install the objects of selection 4-11 to 4-13 in a preset sequence, as shown in FIG. 13. In the install execute sequence 33, the terminal identification information 8-*j*, the aforementioned preset sequence "1", "2" and "3", the unique information 5-11 to 5-13 and the URL 6-11 to 6-13 of the objects of selection 4-11 to 4-13 are stated by the server management unit 25. The preset sequence "1", "2" and "3" means that the objects of selection 4-11, 4-12 and 4-13 are installed in the sequence of "1", "2" and "3". If, when the server management unit 25 has formed the install execute sequence 33, the install processing is discontinued when the objects of selection 4-11, 4-12 and 4-13 are being sent in the sequence of "1", "2" and "3", as when the object of selection 4-12 is being sent to the mobile terminal 1-*j*, the server communication controller 22 may refer to the install execute sequence 33 to re-initiate the interrupted install processing (transmission of the object of selection 4-12 may again be tried).

The server communication controller 22 of the information processing server 2 controls the communication device 29, in accordance with the install execute sequence 33, so that the object of selection 4-11 will be sent to the mobile terminal 1-*j* by the communication function as selected by the user (step S7). Simultaneously, the server communication controller 22 controls the communication device 29 so that the set-up program code 7-11 will be sent to the mobile terminal 1-*j* by the communication function as selected by the user.

The OS 11 of the mobile terminal 1-*j* installs the object of selection 4-11 from the information processing server 2 on the hard disc 10 (database 16) (step S8). Simultaneously, the OS 11 installs the setup program code 7-11 from the information processing server 2 on the hard disc 10 (database 16) in association with the object of selection 4-11.

When the OS 11 has installed the object of selection 4-11, the communication module 12 of the mobile terminal 1-*j* sends a notification of confirmation of install completion 36 to the information processing server 2 for indicating that installation of the object of selection 4-11 has been finished (step S9).

On receipt of the notification of confirmation of install completion 36 by the server communication controller 22 of the information processing server 2 from the mobile terminal 1-*j*, there are the objects of selection 4-12 and 4-13 not as yet sent to the mobile terminal 1-*j* (step S-10-yes). Thus, the server communication controller 22 of the information processing server 2 in a step S7 controls the communication device 19 so that the object of selection 4-12 will be transmitted to the mobile terminal 1-*j* by the communication function as selected by the user. Simultaneously, the server communication controller 22 controls the communication device 29 so that the set-up program code 7-12 will be transmitted to the mobile terminal 1-*j* by the communication function as selected by the user.

In the step S8, the OS 11 of the mobile terminal 1-*j* installs the object of selection 4-12 from the information processing server 2 in the hard disc 10 (database 16). Simultaneously, the OS 11 installs the set-up program code 7-12 from the information processing server 2 in the hard disc 10 (database 16) in association with the object of selection 4-12.

When the OS 11 has installed the object of selection 4-12, the communication module 12 of the mobile terminal 1-*j* in a step S9 sends the notification of confirmation of install completion 36, indicating the fact of the installation of the object of selection, to the information processing server 2, by the communication function as selected by the user.

On receipt by the server communication controller 22 of the information processing server 2 of the notification of confirmation of install completion 36 from the mobile terminal 1-*j*, there is as yet the object of selection 4-13 not as yet sent to the mobile terminal 1-*j* (step S-10-yes). Thus, the server communication controller 22 of the information processing server 2 in a step S7 controls the communication device 29 so that the object of selection 4-13 will be transmitted to the mobile terminal 1-*j* by the communication function as selected by the user. Simultaneously, the server communication controller 22 controls the communication device 29 so that the set-up program code 7-13 will be transmitted to the mobile terminal 1-*j* by the communication function as selected by the user.

In the step S8, the OS 11 of the mobile terminal 1-*j* installs the object of selection 4-13 from the information processing server 2 in the hard disc 10 (database 16). Simultaneously, the OS 11 installs the setup program code 7-13 from the information processing server 2 in the hard disc 10 (database 16) in association with the object of selection 4-13.

When the OS 11 has installed the object of selection 4-13, the communication module 12 of the mobile terminal 1-*j* in a step S9 sends the notification of confirmation of install completion 36, indicating the fact of the installation of the object of selection 4-13, to the information processing server 2, by the communication function as selected by the user.

On receipt by the server communication controller 22 of the information processing server 2 of the notification of confirmation of install completion 36 from the mobile terminal 1-*j*, there is no object of selection 4-13 not as yet sent to the mobile terminal 1-*j* (step S-10-no). Thus, the server communication controller 22 of the information processing server 2 controls the communication device 29 so that the unneeded object list 34 will be transmitted to the mobile terminal 1-*j*, by the communication function as selected by the user (step S11).

The OS 11 of the mobile terminal 1-*j* refers to the unneeded object list 34 from the information processing server 2 to delete the unneeded objects 4-1 to 4-3 of the group of the objects 4-1 to 4-10 installed on the hard disc 10 (database 16) (step S12). Simultaneously, the OS 11 deletes the set-up program codes 7-1 to 7-3, stored in the database 16 in association with the unneeded objects 4-1 to 4-3. The OS 11 stores the information on the installed state "installed" in the database 17 in association with the unique information 5-4 to 5-13 and the URL 6-4 to 6-13.

Figure 14:
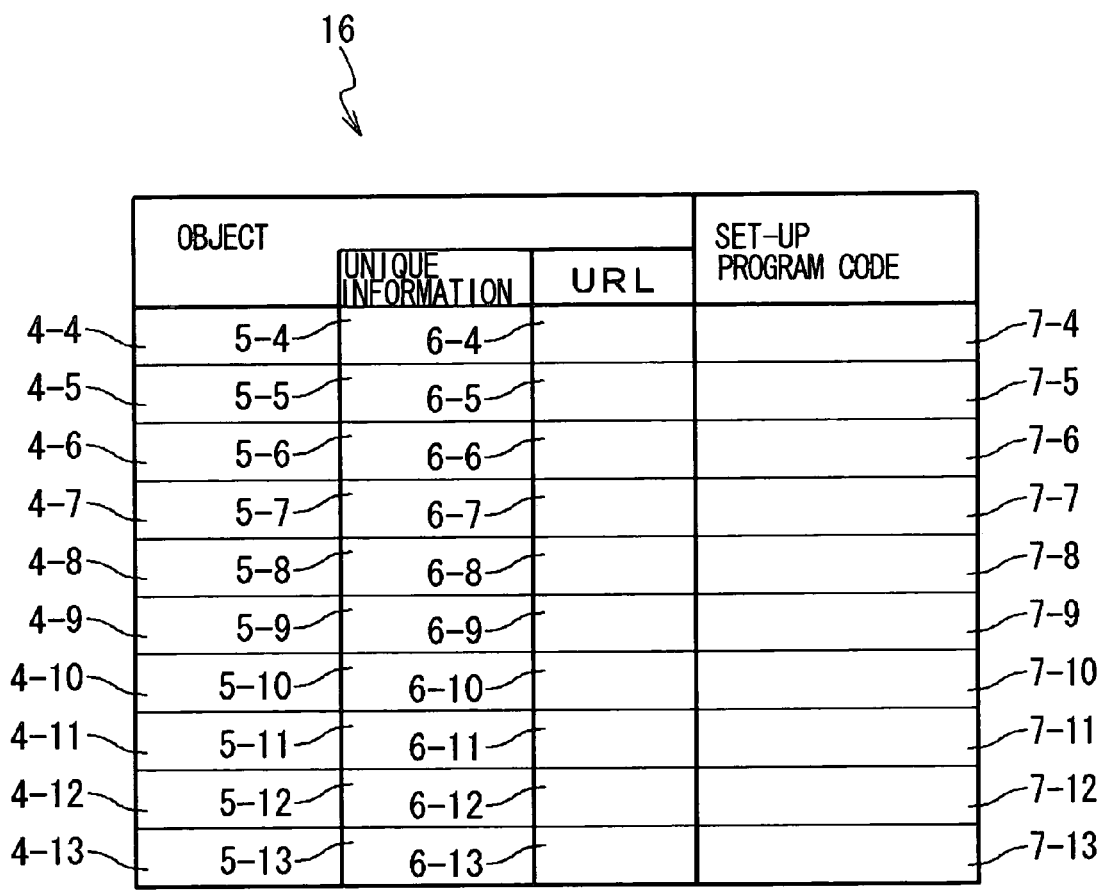
FIG. 14 shows the information stored in the database 16 of the mobile terminal 1-$j$ of present invention.

In the steps S8 and S12, the objects of selection 4-11 to 4-13 and the group of the objects 4-4 to 4-10, having the unneeded objects 4-1 to 4-3 deleted, are stored by the OS 11 in the hard disc 10 (database 16) as the updated group of the objects 4-4 to 4-13 shown in FIG. 14. Referring to FIG. 14, the updated group of the objects 4-4 to 4-13 installed in the database 16 includes the unique information 5-4 to 5-13 and the URL 6-4 to 6-13. In the database 16, the set-up program codes 7-4 to 7-13 are stored in association with the objects 4-4 to 4-13.

Figure 15:
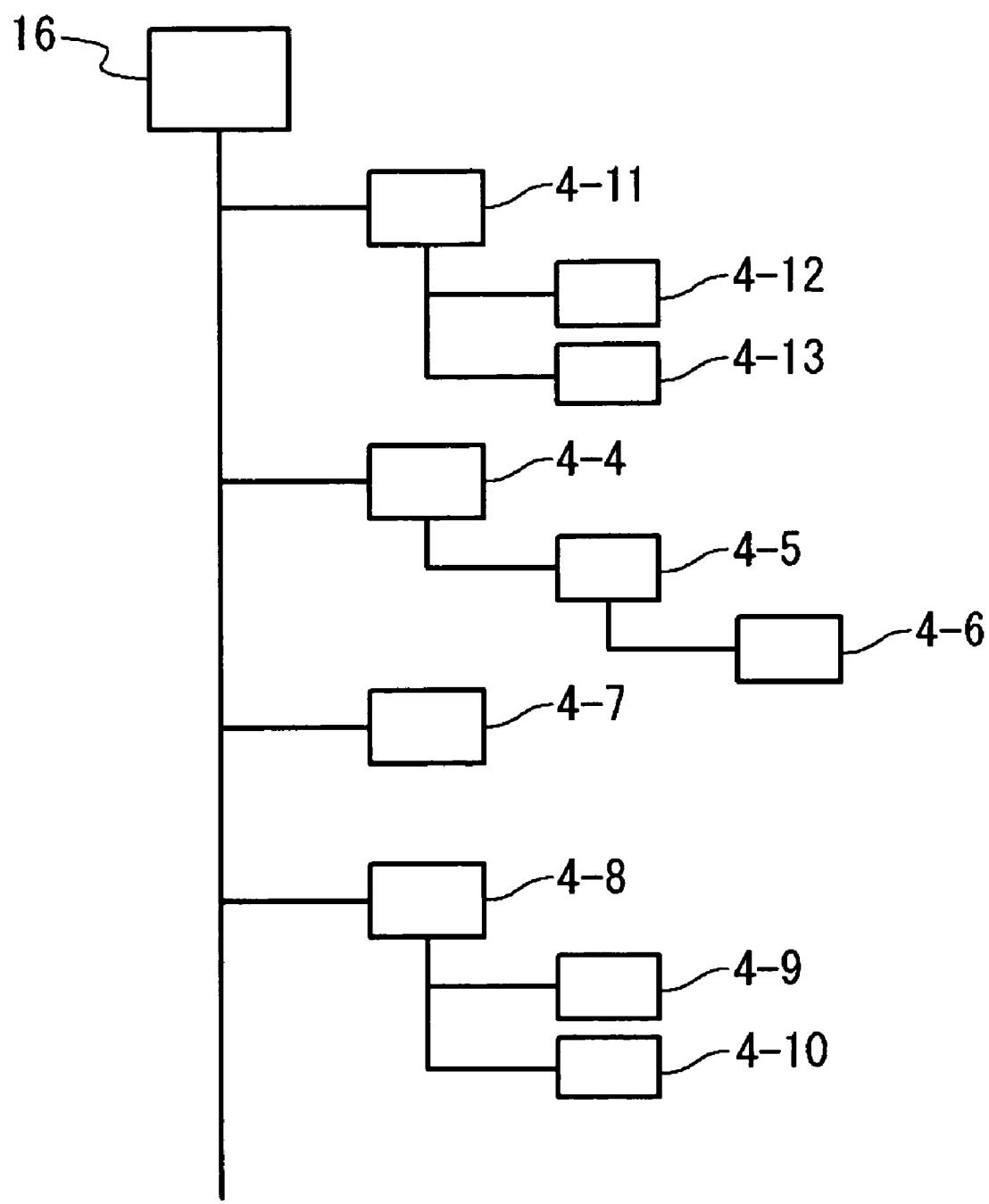
FIG. 15 shows the concept of an updated group of objects 4-4 to 4-13 stored in the database 16 of the mobile terminal 1-$j$ in an embodiment of present invention.

As for the objects 4-4 to 4-13 stored in the database 16, shown in FIG. 15, the object 4-5 is linked to the object 4-4, the object 4-6 is linked to the object 4-5, the objects 4-9 and 4-10 are linked to the object 4-8, the objects 4-12 and 4-13 are linked to the object 4-11 and the object 4-15 is linked to the object 4-11, as the objects 4-4 to 4-13 of the objects 4-1 to 4-*m* stored in the database 26).

When the OS 11 of the mobile terminal 1-*j* has deleted the unneeded objects 4-1 to 4-3, the communication module 12 of the mobile terminal 1-*j* sends a notification of confirmation of the end of deletion 37, indicating the fact of deletion of the unneeded objects 4-1 to 4-3, to the information processing server 2, by the communication function as selected by the user (step S13).

On receipt of the notification of confirmation of the end of deletion 37, the server communication controller 22 of the information processing server 2 forms a list indicating the state of use of the objects 35. The OS 22 stores the list indicating the state of use of the objects 35 in the hard disc 20 (database 26) (step S14).

In the list indicating the state of use of the objects 35, the terminal identification information 8-*j* and the unique information 5-1 to 5-3 as well as the URL 6-1 to 6-3 of the unneeded objects 4-1 to 4-3, now deleted, are stated by the server management unit 25. As the latest information, the unique information 5-4 to 5-10 of the group of objects 4-4 to 4-10, having the unneeded objects 4-1 to 4-3 deleted, and the URL 6-4 to 6-10, and the unique information 5-11 to 5-13 of the group of objects 4-11 to 4-13, newly installed, and the URL 6-11 to 6-13, are stated by the server management unit 25.

In the install processing of the information processing system of the present invention, the user only has to select the unique information 5-11 and the URL 6-11 of the needed object 4-11, as an object actually desired to be employed, using the mobile terminal 1-*j*. Thus, in the information processing system according to the present invention, it is unnecessary to use the terminal to request a download menu (install menu) using the terminal as in the conventional information processing system, such that the object to be used by the user may be acquired promptly.

In the install processing of the information processing system according to the embodiment of the present invention, the link objects 4-12 and 4-13, to be linked to the needed object 4-11, as selected by the user of the mobile terminal 1-*j*, may also be promptly acquired as an object to be used by the user, based on the unique information 5-11 and the URL 6-11 of the needed object 4-11, as selected by the user of the mobile terminal 1-*j*).

In the install processing of the information processing system according to the embodiment of the present invention, the mobile terminal 1-*j* deletes the objects 4-1 to 4-3, which become unnecessary when the mobile terminal 1-*j* has installed the selected objects 4-11 to 4-13 in the hard disc 10 (database 16). Thus, in the information processing system according to the present invention, there is no necessity for the user to search and delete the unneeded objects 4-1 to 4-3, such that the user is able to use the updated group of objects 4-4 to 4-13 installed (updated) in the hard disc 10 (database 16), without confusion).

In the install processing of the information processing system according to the embodiment of the present invention, the information processing server 2 forms the list indicating the state of use of the objects 35 for storage in the hard disc 20 (database 26), so that the information processing server 2 is able to comprehend the updated group of objects 4-4 to 4-13 installed in the mobile terminal 1-*j*.

Figure 17:
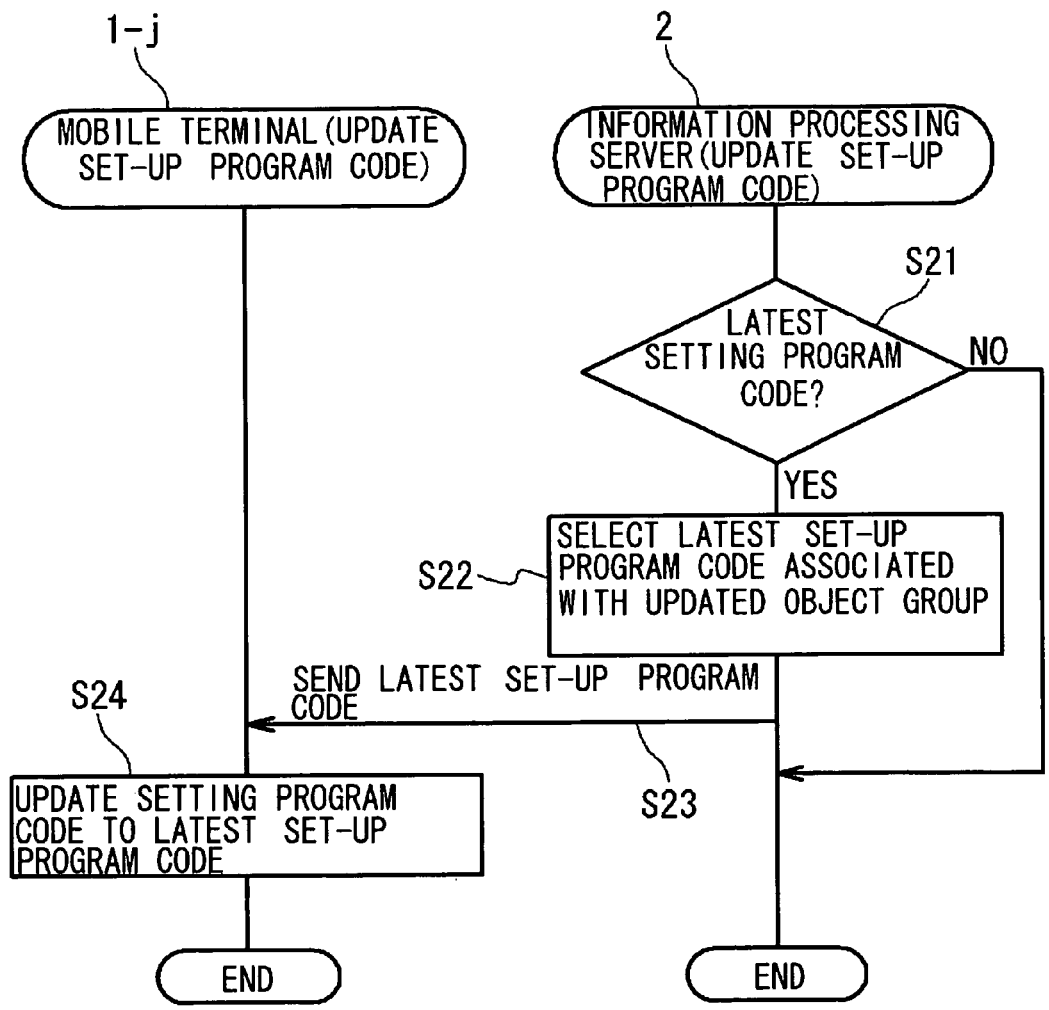
FIG. 17 shows the processing of updating a set-up program code as the operation of the information processing system of the present invention.

FIG. 17 shows the set-up program code update processing, as an operation of the information processing system according to the embodiment of the present invention.

The set-up program codes (7-1 to 7-*m*), stored in the hard disc 20 (database 26), are updated to the latest set-up program codes (7-1 to 7-*m*) by the manager of the information processing server 2 acting on the input device of the information processing server 2 (step S21-yes). At this time, the server management unit 25 of the information processing server 2 refers to the list indicating the state of use of the objects 35 to select the latest set-up program codes (7-4 to 7-13) associated with the group of the updated objects 4-4 to 4-13 of the plural objects 4-1 to 4-*m* stored in the hard disc 20 (database 26) (step S22).

The server communication controller 22 of the information processing server 2 controls the communication device 29 so that the latest set-up program codes (7-4 to 7-13) will be transmitted to the mobile terminal 1-*j* by the communication function previously selected by the user (step S23).

The OS 11 of the mobile terminal 1-*j* updates the set-up program codes (7-4 to 7-13), stored in the hard disc 10 (database 16), to the latest set-up program codes (7-4 to 7-13) (step S24).

Figure 18:
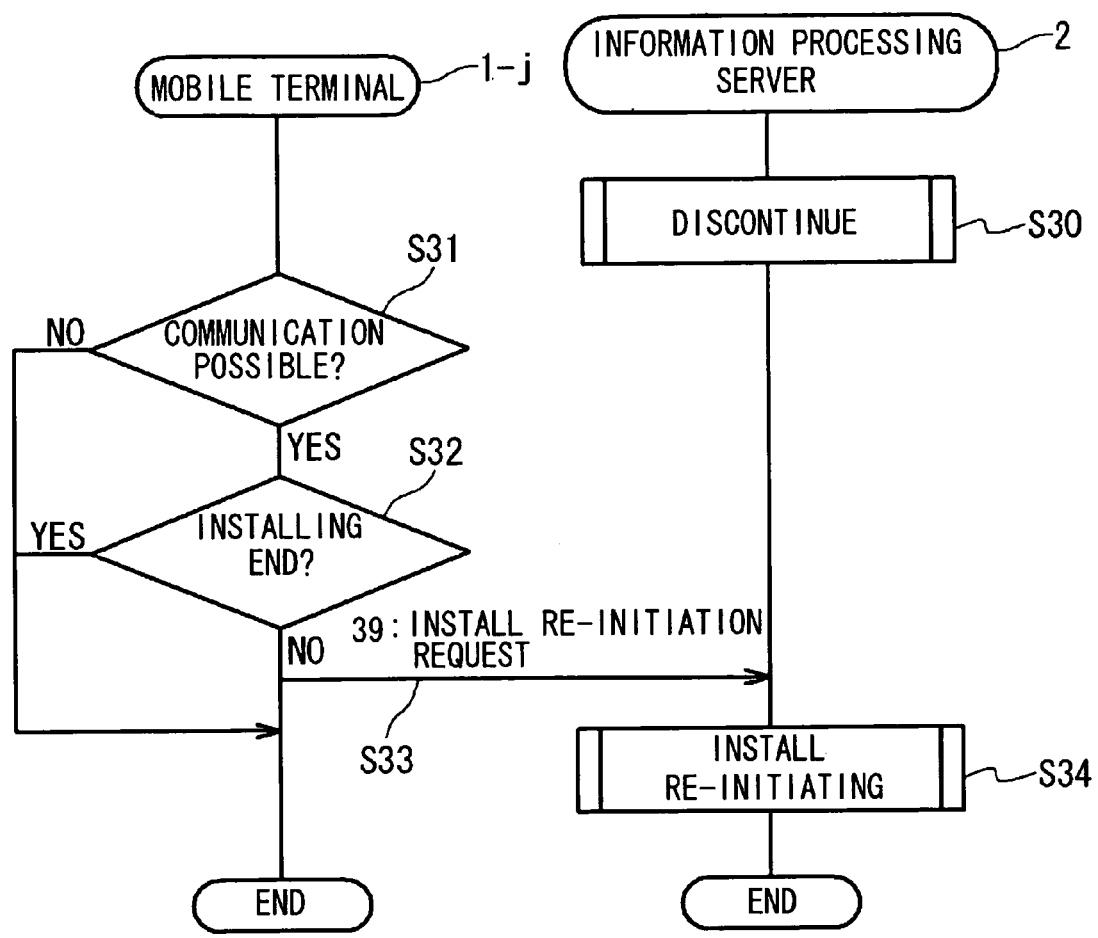
FIG. 18 shows the interruption processing and the install re-initiating processing as operation of the information processing system of the present invention.

FIG. 18 shows the interruption processing and the install re-initiation processing, carried out during the install processing, as the operation of the information processing system according to the embodiment of the present invention.

When the power supply of the mobile terminal 1-*j* is discontinued, or the mobile terminal 1-*j* has moved to outside the sphere of communication, the communication between the mobile terminal 1-*j* and the information processing server 2 is discontinued. If the communication between the mobile terminal 1-*j* and the information processing server 2 is discontinued and the install processing has as yet not come to a close, the server communication controller 22 of the information processing server 2 controls the communication device 29 so that the install processing will be discontinued (that is, so that the processing of interruption will be carried out) in accordance with the install execute sequence 33 (step S30).

The communication between the mobile terminal 1-*j* and the information processing server 2 then becomes possible (step S31-yes). Since the install processing has as yet not come to a close in this case (step S32-no), the communication module 12 of the mobile terminal 1-*j* controls the communication device 19 so that the list indicating the state of use of the objects 35 will be transmitted to the information processing server 2 by the communication function as selected by the user (step S33).

On receipt of the install re-initiation request, the server communication controller 22 of the information processing server 2 controls the communication device 29 so that the install processing, once discontinued, will be re-initiated in accordance with the install execute sequence 33 (step S34).

Thus, in the install processing by the information processing system according to the embodiment of the present invention, in which the information processing server 2 sends the objects of selection 4-11 to 4-13, that is, the necessary object 4-11 and the link objects 4-12 and 4-13, to the mobile terminal 1-*j* in a preset sequence, in accordance with the install execute sequence 33, the install processing may be interrupted on interruption of the communication between the mobile terminal 1-*j* and the information processing server 2, while the install processing, thus interrupted, may be re-initiated, in accordance with the install execute sequence 33, when the communication between the mobile terminal 1-*j* and the information processing server 2 becomes possible.

Figure 19:
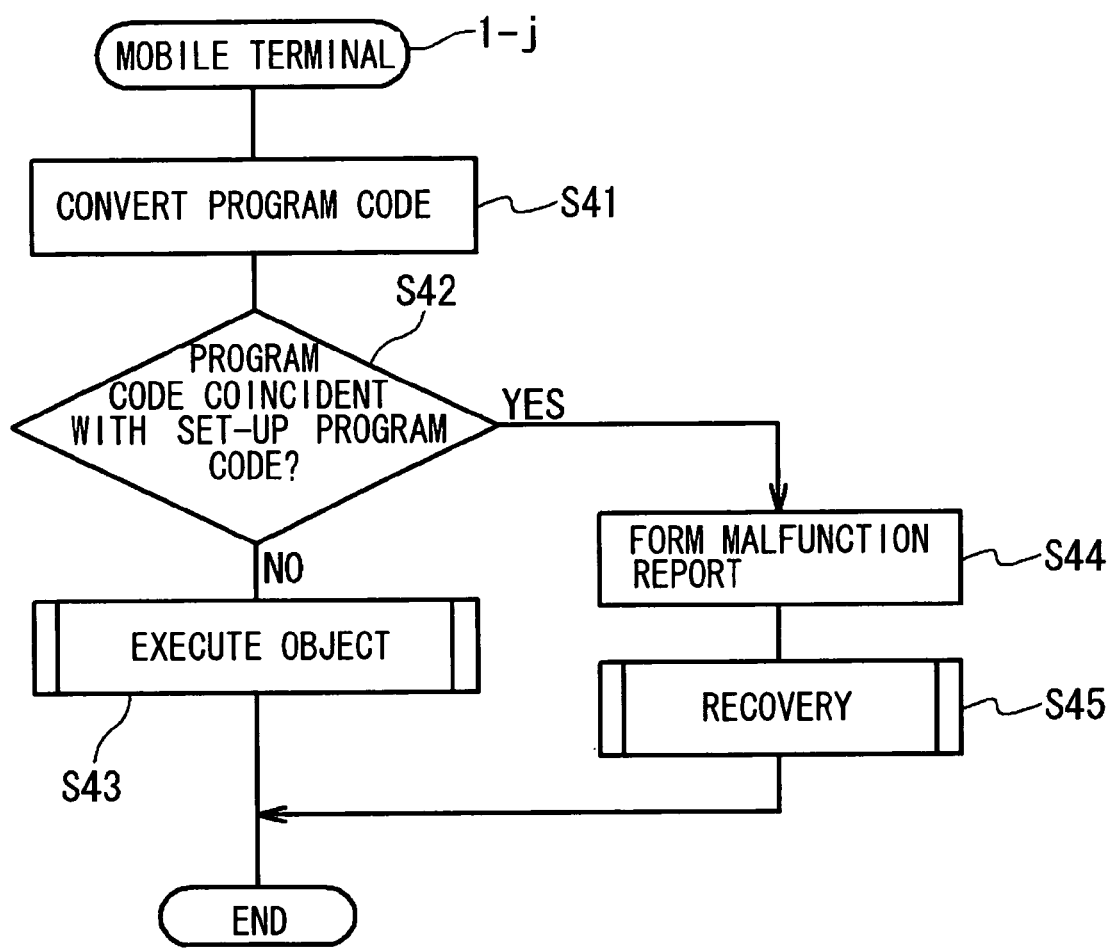
FIG. 19 shows the object execution processing and the restoration processing as operation of the information processing system of the present invention.

FIG. 19 shows the object executing processing and the restoration processing, as the operation of the information processing system according to the embodiment of the present invention.

When executing the updated objects 4-4 to 4-13 installed on the hard disc 10 (database 16), the conversion module 14 of the mobile terminal 1-*j* converts the updated objects 4-4 to 4-13 into program codes as the forms of using the objects on the mobile terminal 1-*j* (step S41). It is now assumed that the objects to be executed are the aforementioned objects of selection 4-11 to 4-13. In the step S41, the conversion module 14 converts the objects of selection 4-11 to 4-13 to the program codes of the form for use on the mobile terminal 1-*j*. The management module 15 collates the program code s, converted for using the objects of selection 4-11 to 4-13, to the set-up program codes 7-11 to 7-13 (step S42).

In case of non-coincidence of the program cod s e and the set-up program codes 7-11 to 7-13 (step S42-no), the management module 15 of the mobile terminal 1-*j* recognizes that no malfunction occurs in executing the objects of selection 4-11 to 4-13 installed on the database 16, and performs object executing processing for executing the objects of selection 4-11 to 4-13 (step S43).

In case of coincidence of the program codes and the set-up program codes 7-11 to 7-13 (step S42-yes), there occurs the malfunction in executing the objects of selection 4-11 to 4-13 installed on the database 16. Thus, the management module 15 of the mobile terminal 1-*j* forms a malfunction report 41 shown in FIG. 21 (step S44) to proceed to the restoration processing (step S45). The malfunction report 41 represents the objects of selection 4-11 to 4-13 where the malfunction has occurred. In the malfunction report 41, the terminal identification information 8-*j* and the unique information 5-11 to 5-13 as well as the URL 6-11 to 6-13 of the objects of selection 4-11 to 4-13 where the malfunction has occurred, are stated by the management module 15.

Figure 20:
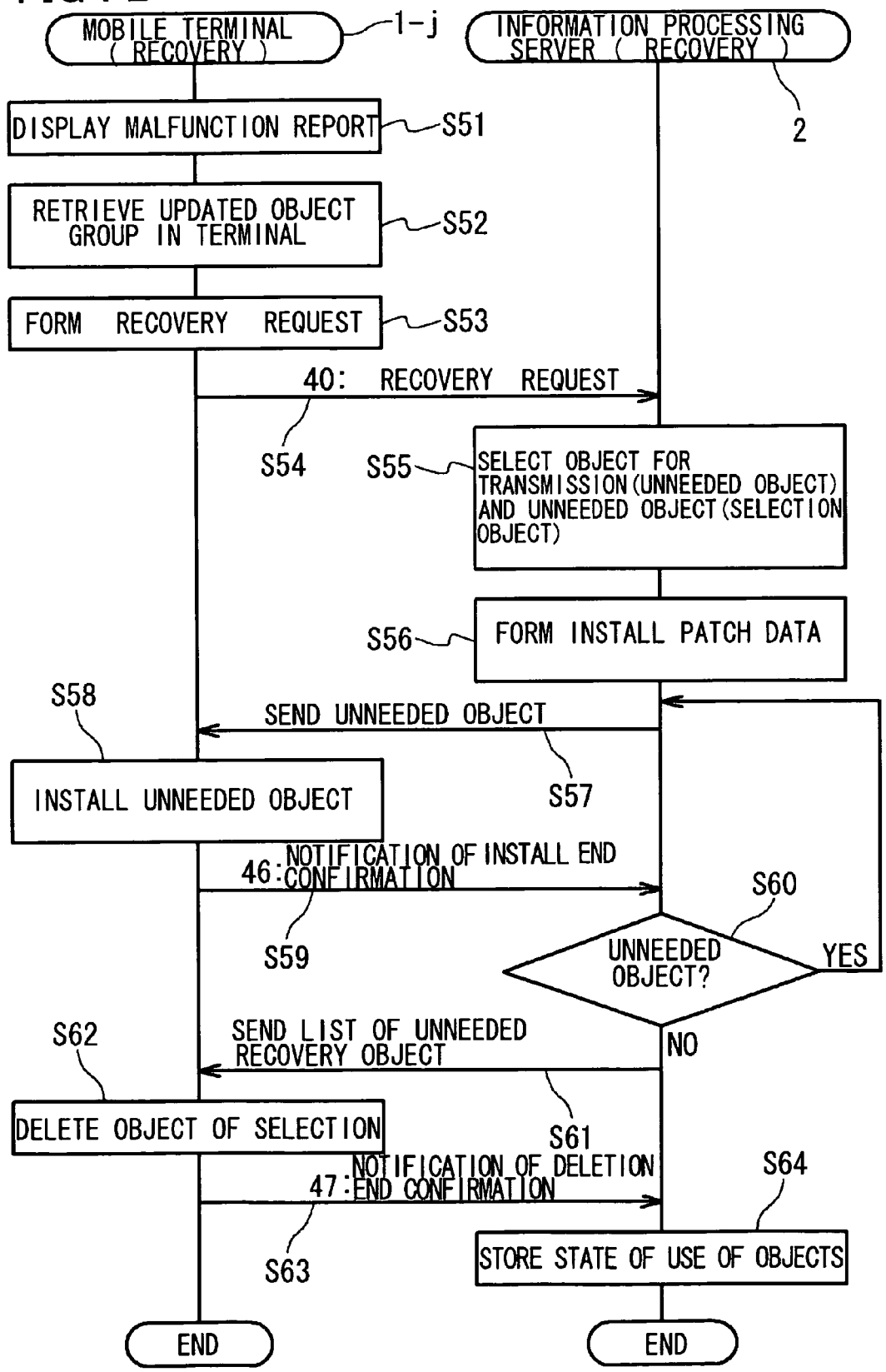
FIG. 20 shows the restoration processing, shown in FIG. 19, as the operation of the information processing system of the present invention.

FIG. 20 shows the restoration processing, as the operation of the information processing system according to the embodiment of the present invention, shown in FIG. 19.

On transfer to the restoration processing, the management module 15 of the mobile terminal 1-*j* controls the display of the mobile terminal 1-*j* such as to display the malfunction report 41, in order to advise the user of the objects of selection 4-11 to 4-13 where the malfunction has occurred (step S51).

When the malfunction report 41 is displayed in the step S51, the user actuates the input device of the mobile terminal 1-*j* to select one of the communication functions employing the HTTP, TCP/IP, Bluetooth and the infrared rays.

The management module 15 of the mobile terminal 1-*j* then retrieves the updated group of the objects 4-4 to 4-13 installed on the hard disc 10 (database 16) (step S52).

On retrieval of the updated group of the objects 4-4 to 4-13 in the step S52, the management module 15 forms a recovery request list 42 shown in FIG. 22. The recovery request list 42 represents the updated group of the objects 4-4 to 4-13 installed on the hard disc 10 (database 16). In this recovery request list 42, the terminal identification information 8-*j* and the unique information 5-4 to 5-13 as well as the URL 6-4 to 6-13 of the object group 4-4 to 4-13 are stated in the management module 15.

The management module 15 of the mobile terminal 1-*j* then forms a recovery request 40 including the malfunction report 41 and the recovery request list 42 (step S53). The communication module 12 of the mobile terminal 1-*j* controls the communication device 19 such as to transmit the recovery request 40 to the information processing server 2 by the communication function as selected by the user (step S54). The recovery request 40 is an install request for restoring the updated group of the objects 4-4 to 4-13, installed on the hard disc 10 (database 16), into the group of the objects 4-1 to 4-10.

On receipt of the recovery request 40 from the mobile terminal 1-*j*, the server communication controller 22 of the information processing server 2 comprehends the communication function selected by the user, such that its OS 22 causes the malfunction report 41 contained in the recovery request 40 to be stored in the hard disc 20 (data base 26). By a developer for the information processing server 2 actuating the input device of the information processing server 2, the server management unit 25 of the information processing server 2 demonstrates the malfunction report 41 stored in the database 26 on the display of the information processing server 2. Thus, the manager is able to develop the object and the set-up program code based on this malfunction report 41.

The server management unit 25 of the information processing server 2 is responsive to the recovery request 40 to select an object to be sent to the mobile terminal 1-*j* (unneeded object) and an object which becomes unnecessary (object of selection) from the plural objects 4-1 to 4-*m* stored in the hard disc 20 (data base 26) (step S55).

The selection of the object for transmission (unneeded object) in the step S55 is now explained.

The server management unit 25 of the information processing server 2 refers to the malfunction report 41 and the recovery request list 42, contained in the recovery request 40, and to the list indicating the state of use of the objects 35, stored in the hard disc 20 (data base 26), to select the unneeded object 4-1 to be installed in the hard disc 10 (database 16) of the mobile terminal 1-*j*, from among the plural objects (4-1 to 4-*m*) stored in the hard disc 10 (data base 16). Simultaneously, the server management unit 25 also selects the set-up program code 7-1, associated with the unneeded object 4-1, from the plural set-up program codes 7-1 to 7-*m* stored in the database 26).

The server management unit 25 of the information processing server 2 refers to the malfunction report 41 and the recovery request list 42, contained in the recovery request 40, and to the list indicating the state of use of the objects 35, stored in the hard disc 20 (data base 26), to select link objects (unneeded objects) 4-2 and 4-3, including the unique information 5-2 and 5-3 and the URL 6-2 and 6-3, which are linked to the unneeded object 4-1 and which are not stated in the recovery request list 42, from the plural objects 4-1 to 4-*m* stored in the hard disc 20 (data base 26). Simultaneously, the server management unit 25 also selects the set-up program codes 7-2 and 7-3, associated with the unneeded objects 4-2 and 4-3, from the plural set-up program codes 7-1 to 7-*m* stored in the database 26).

The selection of the unneeded object (object of selection) in a step S55 is explained.

The server management unit 25 of the information processing server 2 refers to the malfunction report 41, recovery request list 42 and to the list indicating the state of use of the objects 35 to form a list of unneeded restoration objects 44 shown in FIG. 23. The list of unneeded restoration objects 44 represents the objects of selection 4-11 to 4-13 which become unnecessary when the unneeded objects of selection 4-1 to 4-3 among the objects 4-1 to 4-13 of the updated object group are installed on the hard disc 10 (database 16). In the list of unneeded restoration objects 44, there are stated the terminal identification information 8-*j* as well as the unique information 5-11 to 5-13 and the URL 6-11 to 6-13 of the objects of selection 4-11 to 4-13 by the server management unit 25).

The server management unit 25 of the information processing server 2 forms install patch data for compressing the unneeded objects 4-1 to 4-3 for enabling the installation (step S56).

Figure 24:
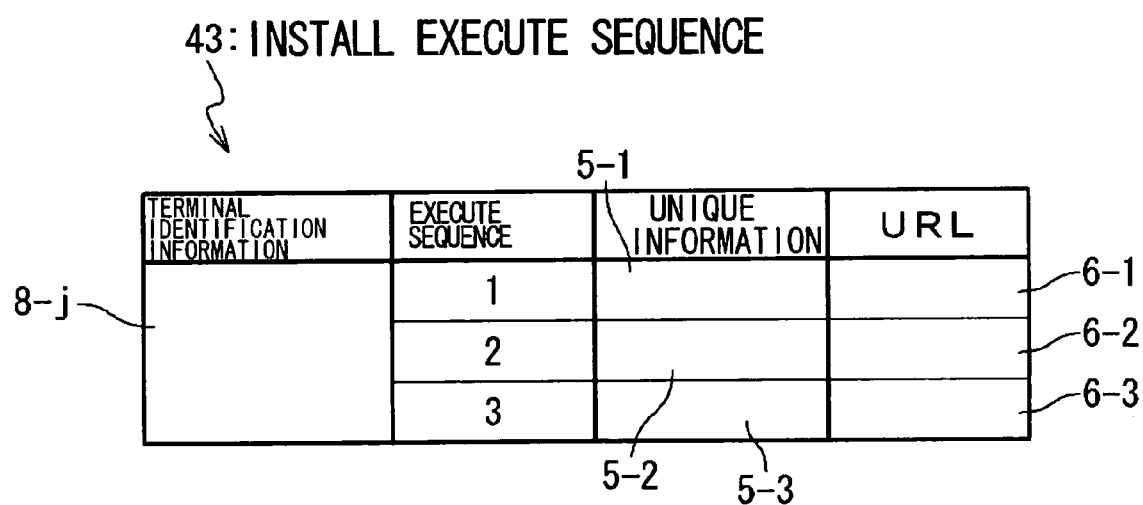
FIG. 24 shows an install execute sequence 43 of the information processing system of the present invention.

When the install patch data are prepared in the step S6, the server management unit 25 forms an install execute sequence 43 for the mobile terminal 1-*j* to install the unneeded objects 4-1 to 4-3 in a preset sequence, as shown in FIG. 24. In the install execute sequence 43, the terminal identification information 8-*j*, the aforementioned preset sequence "1", "2" and "3", the unique information 5-1 to 5-3 and the URL 6-1 to 6-3 of the unneeded objects 4-1 to 4-3 are stated by the server management unit 25. The preset sequence "1", "2" and "3"

means that the unneeded objects 4-1, 4-2 and 4-3 are installed in the sequence of "1", "2" and "3". If the install processing is discontinued when the objects of selection 4-1, 4-2 and 4-3 are being sent in the sequence of "1", "2" and "3", for example, if the install processing is discontinued when the unneeded object 4-2 is being sent to the mobile terminal 1-*j*, the server communication controller 22 may refer to the install execute sequence 43 to re-initiate the interrupted install processing (transmission of the unneeded object 4-2 may again be tried) by the server management unit 25 forming the install execute sequence 43.

The server communication controller 22 of the information processing server 2 controls the communication device 29 so that the unneeded object of selection 4-1 will be sent to the mobile terminal 1-*j*, in accordance with the install execute sequence 43, by the communication function as selected by the user (step S57). Simultaneously, the server communication controller 22 controls the communication device 29 so that the set-up program code 7-1 will be sent to the mobile terminal 1-*j* by the communication function as selected by the user.

The OS 11 of the mobile terminal 1-*j* installs the unneeded object 4-1 from the information processing server 2 on the hard disc 10 (database 16) (step S58). Simultaneously, the OS 11 installs the set-up program code 7-1 from the information processing server 2 on the hard disc 10 (database 16) in association with the object of selection 4-1.

When the OS 11 has installed the unneeded object 4-11, the communication module 12 of the mobile terminal 1-*j* sends a notification of confirmation of install completion 46 to the information processing server 2 for indicating that the unneeded object 4-11 has been installed (restored) (step S59).

On receipt by the server communication controller 22 of the information processing server 2 of the notification of confirmation of install completion 46 from the mobile terminal 1-*j*, there are the unneeded objects 4-2 and 4-3 not as yet sent to the mobile terminal I-*j* (step S-10-yes). Thus, the server communication controller 22 of the information processing server 2 in a step S57 controls the communication device 29 so that the object of selection 4-2 will be transmitted to the mobile terminal 1-*j* in accordance with the install execute sequence 43 by the communication function as selected by the user. Simultaneously, the server communication controller 22 controls the communication device 29 so that the set-up program code 7-2 will be transmitted to the mobile terminal 1-*j* by the communication function as selected by the user.

In the step S58, the OS 11 of the mobile terminal 1-*j* installs the object of selection 4-2 from the information processing server 2 in the hard disc 10 (database 16). Simultaneously, the OS 11 installs the setup program code 7-2 from the information processing server 2 in the hard disc 10 (database 16) in association with the unneeded object of selection 4-2.

When the OS 11 has installed the unneeded object 4-2, the communication module 12 of the mobile terminal 1-*j* sends to the information processing server 2 the notification of confirmation of install completion 46, indicating the fact of the installation of the unneeded object 4-11, by the communication function as selected by the user (step S59).

On receipt by the server communication controller 22 of the information processing server 2 of the notification of confirmation of install completion 46 from the mobile terminal 1-*j*, there are as yet unneeded objects 4-2, 4-3 not as yet sent to the mobile terminal 1-*j* (step S-60-yes). Thus, the server communication controller 22 of the information processing server 2 in a step S57 controls the communication device 29 so that the unneeded object 4-2 will be transmitted to the mobile terminal 1-*j* in accordance with the install execute function 43 by the communication function as selected by the user. Simultaneously, the server communication controller 22 controls the communication device 29 so that the set-up program code 7-3 will be transmitted to the mobile terminal 1-*j* by the communication function as selected by the user.

In the step S58, the OS 11 of the mobile terminal 1-*j* installs the unneeded object 4-3 from the information processing server 2 in the hard disc 10 (database 16). Simultaneously, the OS 11 installs the set-up program code 7-2 from the information processing server 2 in the hard disc 10 (database 16) in association with the unneeded object 4-2.

When the OS 11 has installed the unneeded object 4-3, the communication module 12 of the mobile terminal 1-*j* in a step S59 sends the notification of confirmation of install completion 46, indicating the fact of the installation (restoration) of the unneeded object 4-3, to the information processing server 2, by the communication function as selected by the user.

When the server communication controller 22 of the information processing server 2 has received the notification of confirmation of install completion 46, there is no object of selection not as yet transmitted to the mobile terminal 1-*j* (step S60-no). Thus, the server communication controller 22 controls the communication device 29 so that the list of unneeded restoration objects 44 will be transmitted to the mobile terminal 1-*j* by the communication function as selected by the user (step S61).

The OS 11 of the mobile terminal 1-*j* refers to the list of unneeded restoration objects 44 from the information processing server 2 to delete the objects of selection 4-11 to 4-13 of the updated group of the objects 4-1 to 4-13 installed on the hard disc 10 (database 16) (step S62). Simultaneously, the OS 11 deletes the set-up program codes 7-11 to 7-13, stored in the database 16 in association with the objects of selection 4-11 to 4-13. The OS 11 stores the information on the installed state "installed" in the database 17 in association with the unique information 5-1 to 5-10 and the URL 6-1 to 6-10.

In the steps S58 and S62, the unneeded objects 4-1 to 4-3, and the object group 4-1 to 4-10, having the objects of selection 4-11 to 4-13, deleted are stored as the object group 4-1 to 4-10, shown in FIG. 6, in the hard disc 10 (database 16), for restoring the object group 4-1 to 4-10.

When the OS 11 of the mobile terminal 1-*j* has deleted the objects of selection 4-11 to 4-13, the communication module 12 of the mobile terminal 1-*j* sends to the information processing server 2 a notification of confirmation of deletion completion 37, indicating the deletion of the objects of selection 4-11 to 4-13, by the communication function as selected by the user (step S63).

On receipt of the notification of confirmation of install completion 47 from the mobile terminal 1-*j*, the communication controller 22 of the information processing server 2 forms a list of state of use of the objects 45. The OS 22 causes the list of state of use of the objects 45 to be stored in the hard disc 20 (data base 26) (step S64).

Referring to FIG. 25, there are stated, by the server management unit 25, the terminal identification information 8-*j*, unique information 5-11 to 5-13 and the URL 6-11 to 6-13 of the presently deleted objects of selection 4-11 to 4-13, while there are stated, by the server management unit 25, the unique information 5-4 to 5-10 and the URL 6-4 to 6-10 of the set of objects 4-4 to 4-10, having the objects of selection 4-11 to 4-13 deleted, and the unique information 5-1 to 5-3 as well as the URL 6-1 to 6-3 of the newly installed unneeded objects 4-1 to 4-3, as the latest information stored in the mobile terminal 1-*j*.

As described above, in the install processing of the information processing system according to the embodiment of the present invention, the information processing server 2 comprehends the updated object group of the objects 4-4 to 4-13 installed in the mobile terminal 1-*j*. Thus, in case a malfunction has occurred in executing the objects of selection 4-11 to 4-13 installed e.g. on the hard disc 10 (database 16), that is, in case a malfunction has occurred as a result of installation of the objects of selection 4-11 to 4-13, the updated object group of the objects 4-4 to 4-13 installed in the hard disc 10 (database 16) can be restored to the original group of the objects 4-1 to 4-10.

In case the objects, where the malfunction has occurred, are the objects of selection 4-11 to 4-13, installed on the hard disc 10 (database 16), the malfunction report 41 is relevant to the objects of selection 4-11 to 4-13. In the information processing system according to the present invention, development of the objects 4-1 to 4-*m* and the set-up program codes 7-1 to 7-*m* by the manager of the information processing server 2 may be supported based on this malfunction report 41.

Figure 26:
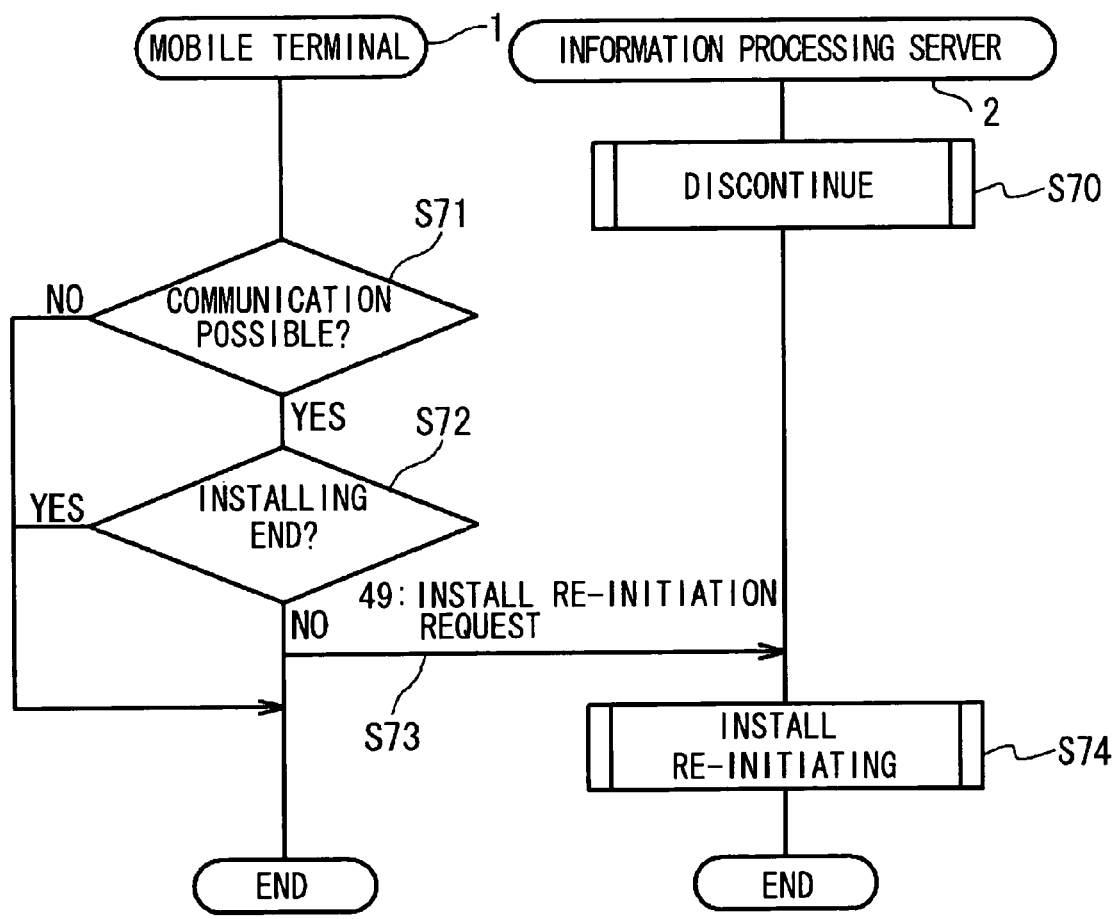
FIG. 26 shows interruption processing and installation re-initiating processing, performed during the restoration processing, as operation of the information processing system of the present invention.

FIG. 26 shows the interruption processing and the install re-initiation processing, carried out during the restoration processing, as the operation of the information processing system according to the embodiment of the present invention.

On power down of the mobile terminal 1-*j*, or on movement of the mobile terminal 1-*j* from the communication zone to outside the communication zone, the communication between the mobile terminal 1-*j* and the information processing server 2 is interrupted. If, when the communication between the mobile terminal 1-*j* and the information processing server 2 is interrupted, the restoration processing has as yet not come to a close, the server communication controller 22 of the information processing server 2 controls the communication device 29 so that the restoration processing will be discontinued (interruption processing will be carried out) in accordance with the install execute sequence 43 (step S70).

The communication between the mobile terminal 1-*j* and the information processing server 2 then becomes possible (step S71-yes). In this case, since the restoration processing has as yet not come to a close (step S72-no), the communication module 12 of the mobile terminal 1-*j* controls the communication device 19, by the communication function as selected by the user, so that the install re-initiation request 45 will be sent to the information processing server 2 (step S73).

On receipt of the install re-initiation request 45, the server communication controller 22 of the information processing server 2 controls the communication device 29 so that the restoration processing interrupted will be re-initiated in accordance with the install execute sequence 43 (step S74).

Thus, with the restoration processing of the information processing system according to the embodiment of the present invention, in which the unneeded objects 4-1 to 4-3 are sent in a preset sequence to the mobile terminal 1-*j*, in accordance with the install execute sequence 43, it is possible to interrupt the restoration processing in case of interruption of communication between the mobile terminal 1-*j* and the information processing server 2 and to re-initiate the restoration processing, thus interrupted, in accordance with the install execute sequence 43, in case the communication between the mobile terminal 1-*j* and the information processing server 2 has become possible.

The meritorious effects of the present invention are summarized as follows.

In the install processing by the information processing system according to the present invention, it is only sufficient that the user selects the unique information 5-11 and the URL 6-11 of the needed object 4-11, as an object desired to be used, with the aid of the mobile terminal 1-*j*. Thus, with the information processing system according to the present invention, the user is able to promptly acquire the object, desired to be used, without it being necessary to request a download menu (install menu) from a server, with the aid of the terminal, as in the conventional information processing system.

With the install processing by the information processing system according to the present invention, the link objects 4-12 and 4-13, linked to the needed object 4-11, may also be promptly acquired as the objects employed by the user, by the unique information 5-11 and the URL 6-11 of the needed object 4-11, as selected by the user of the mobile terminal 1-*j*.

With the install processing by the information processing system according to the present invention, the unneeded objects 4-1 to 4-3, which become unnecessary when the mobile terminal 1-*j* has installed the objects of selection 4-11 to 4-13 on the hard disc 10 (database 16) by the mobile terminal 1-*j*, are deleted. As a consequence, it is unnecessary for the user to search and delete the unneeded objects 4-1 to 4-3, such that the user is able to use the updated group of objects 4-4 to 4-13, installed (updated) on the hard disc 10 (database 16), without confusion.

With the install processing by the information processing system according to the present invention, the information processing server 2 sends the objects of selection 4-11 to 4-13 (the needed object and the link objected linked to the object 4-11) in a preset sequence to the mobile terminal 1-*j*, so that it is possible to discontinue the install processing when the communication between the mobile terminal 1-*j* and the information processing server 2 is interrupted, and to re-initiate the once discontinued install processing, in accordance with the install execute sequence 33, in case the communication between the mobile terminal 1-*j* and the information processing server 2 has become possible.

With the install processing by the information processing system according to the present invention, the information processing server 2 comprehends the updated group of the objects 4-4 to 4-13, installed on the mobile terminal 1-*j*. Thus, in the restoration processing of the information processing system according to the present invention, in case a malfunction has occurred in executing the objects of selection 4-11 to 4-13, installed on the hard disc 10 (database 16), the updated group of the objects 4-4 to 4-13, installed on the hard disc 10 (database 16), can be restored to the former group of the objects 4-1 to 4-10.

If the objects suffering from the malfunction are the objects of selection 4-11 to 4-13, installed on the hard disc 10 (database 16), the malfunction report 41 is relevant to the objects of selection 4-11 to 4-13. With the information processing system according to the present invention, it is possible to support the development of the objects 4-1 to 4-*m* and the set-up program codes 7-1 to 7-*m*, carried out by the manager of the information processing server 2.

In the restoration processing of the information processing system according to the present invention, in which the information processing server 2 sends the unneeded objects 4-1 to 4-3 in a preset sequence to the mobile terminal 1-*j* in accordance with the install execute sequence 43, it is possible to discontinue the restoration processing in case the communication between the mobile terminal 1-*j* and the information processing server 2 is interrupted, and to re-initiate the once discontinued install processing, in accordance with the install execute sequence 33, in case the communication between the mobile terminal 1-*j* and the information processing server 2 has become possible.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An information processing system, comprising:
an information processing server connected to a network and including a server storage device having a plurality of objects stored therein, each object having unique information and a URL (Uniform Resource Locator) for accessing to said information processing server for updating said plurality of objects; and
at least one mobile terminal being connected to said network for transmitting an install request including an install list including said unique information and the URL of an object among said plural objects that is necessary for installation,
said information processing server referring to said install list to select an object for transmission from said plural objects stored in said server storage device to transmit the selected object,
wherein said mobile terminal includes a terminal storage device having stored therein a group of objects among said plural objects,
wherein said install request further includes an installed list including therein unique information and the URL of said group of objects,
wherein said information processing server refers to said installed list to form a list of unneeded objects, among the objects of said group of objects, an unneeded object being an object which becomes unnecessary when said selected object has been installed on said terminal storage device, and sends said list of unneeded objects to said mobile terminal along with said selected object,
wherein said mobile terminal installs the selected object sent from said information processing server in said terminal storage device, said mobile terminal referring to the list of unneeded objects sent from said information processing server to delete said unneeded objects from said group of objects,
wherein said selected object and the deleted objects are stored in said terminal storage device as an updated group of objects by said mobile terminal,
wherein said install request further includes terminal identification information for discriminating said mobile terminal,
wherein said information processing server forming a list of state of use of the objects in said server, responsive to said install request, to store said list in said server storage device,
wherein said list of state of use of the objects having therein said terminal identification information, said unique information and the URL of the unneeded object, presently deleted, said unique information and the URL of said group of objects having said unneeded object deleted, and said unique information and the URL of presently newly installed selected object, stated by said information processing server,
wherein said mobile terminal sends to said information processing server a recovery request, as said install request, for restoring the updated group of objects, installed in said terminal storage device, to said group of objects, when a malfunction occurs in executing each object of the group of the updated objects installed in said terminal storage device,
wherein said recovery request including a recovery request list having stated therein by said mobile terminal said terminal identification information and said unique information as well as the URL of said updated group of objects installed in said terminal storage device,
wherein said information processing server referring to said recovery request list and the list of state of use of the objects stored in said server storage device to select from said plural objects stored in said server storage device said unneeded object to be installed by said mobile terminal in said terminal storage device; said information processing server forming a list of unneeded restoration objects, among the objects of said group of objects, having therein the unique information and the URL of the selected object which become unnecessary when the unneeded object has been installed in said terminal storage device, said information processing server transmitting the list of unneeded restoration objects to said mobile terminal along with said unneeded object,
wherein a set-up program code associated with each of the objects of the updated object group is stored in said terminal storage device, and
wherein said mobile terminal in executing each of the objects of said updated object group installed in said terminal storage device converts each updated object into a program code which is a form of using each updated object on said mobile terminal, and sends to said information processing server a malfunction report representing each updated object suffering from said malfunction based on a result of collation between said program code and the set-up program code.

2. The information processing system according to claim 1, wherein said information processing server refers to said install list to select said needed object from said plural objects stored in said server storage device; said information processing server referring to said installed list to select from said plural objects stored in said server storage device a link object including said unique information and the URL, said link object being linked to said needed object and not being stated in the installed list, said information processing server sending said needed object and said link object to said mobile terminal as said selected object.

3. The information processing system according to claim 2, wherein
said information processing server forms an install execute sequence for installing said needed object and the link object in a preset sequence and sends said needed object and the link object in said install execute sequence to said mobile terminal.

4. The information processing system according to claim 3, wherein
if the communication between said mobile terminal and the said information processing server is interrupted during the install processing as from transmission of said install request from said mobile terminal to said information processing server until the object from said information processing server is installed in said terminal storage device, said information processing server discontinues the install processing in accordance with said install execute sequence;
said mobile terminal sending an installation re-initiating request to said information processing server in case the communication between said mobile terminal and the said information processing server is possible; and said information processing server on receipt of said installation re-initiating request re-initiating the discontinued install processing in accordance with said install execute sequence).

5. The information processing system according to claim 1, wherein a plurality of said set-up program codes, associated with said plural objects, are stored in said server storage device, and wherein when said set-up program code, stored in said server storage device, is updated to a latest set-up program codes, said information processing server refers to said list of state of use of the objects to transmit said latest set-up program code associated with each of the objects of the updated object group, among the plural objects stored in said server storage device, to said mobile terminal, and said mobile terminal updating said set-up program code stored in said terminal storage device to said latest set-up program code.

6. The information processing system according to claim 1, wherein said terminal identification information and said unique information and the URL of each of said updated objects where said malfunction has occurred are stated by said mobile terminal in said malfunction report; and said information processing server storing said malfunction report in said server storage device.

7. The information processing system according to claim 1, wherein said set-up program code comprises a program code where said malfunction occurs; and wherein said mobile terminal sends said malfunction report to said information processing server in case of coincidence of said program code and the set-up program code.

8. The information processing system according to claim 1, wherein said malfunction report is included in said recovery request.

9. An information processing system, comprising:

an information processing server connected to a network and including a server storage device having a plurality of objects stored therein; and at least one mobile terminal connected to said network and including a terminal storage device having stored therein an object group among said plural objects, said mobile terminal sending an install request to said information processing server; said install request including an install list representing a needed object among said plural objects that is necessary for installation and an installed list representing said group of objects installed in said terminal storage device, said information processing server referring to said install list to select an object for transmission from said plural objects stored in said server storage device; said information processing server also referring to said installed list to form a list of unneeded objects, among the objects of said group of objects, said unneeded object being an objects which becomes unnecessary when said selected object has been installed on said terminal storage device, said information processing server sending said selected object and the list of unneeded objects to said mobile terminal, wherein each of said plural objects includes unique information and a URL (Uniform Resource Locator) for accessing to said information processing server for accessing, said install list having therein the unique information and the URL of said needed object stated by said mobile terminal, said installed list having therein unique information and the URL of said group of objects stated by said mobile terminal, wherein said list of unneeded objects have therein the unique information and the URL of said unneeded objects stated by said information processing server, wherein said mobile terminal installs the selected object sent from said information processing server in said terminal storage device, said mobile terminal referring to the list of unneeded objects sent from said information processing server to delete said unneeded objects from said group of objects, wherein said selected object and the deleted objects are stored in said terminal storage device as an updated group of objects by said mobile terminal, wherein said install request further includes a terminal identification information for discriminating said mobile terminal, said information processing server forming a list of state of use of the objects in said server, responsive to said install request, to store said list in said server storage device, and said list of state of use of the objects having therein said terminal identification information, said unique information and the URL of the unneeded object, presently deleted, said unique information and the URL of said group of objects having said unneeded object deleted, and said unique information and the URL of presently newly installed selected object, stated by said information processing server, wherein said mobile terminal sends to said information processing server a recovery request, as said install request, for restoring the updated group of objects, installed in said terminal storage device, to said group of objects, when a malfunction occurs in executing each object of the group of the updated objects installed in said terminal storage device, wherein said recovery request including a recovery request list having stated therein by said mobile terminal said terminal identification information and said unique information as well as the URL of said updated group of objects installed in said terminal storage device, wherein said information processing server referring to said recovery request list and the list of state of use of the objects stored in said server storage device to select from said plural objects stored in said server storage device said unneeded object to be installed by said mobile terminal in said terminal storage device, wherein said information processing server forming a list of unneeded restoration objects, among the objects of said group of objects, having stated therein the unique information and the URL of the selected object which become unnecessary when the unneeded object has been installed in said terminal storage device, said information processing server transmitting the list of unneeded restoration objects to said mobile terminal along with said unneeded object, wherein a set-up program code associated with each of the objects of the updated object group is stored in said terminal storage device, and wherein said mobile terminal in executing each of the objects of said updated object group installed in said terminal storage device converts each updated object into a program code which is a form of using each updated object on said mobile terminal, and sends to said information processing server a malfunction report representing each updated object suffering from said malfunction based on a result of collation between said program code and the set-up program code.

10. The information processing system according to claim 9, wherein said information processing server refers to said install list to select said needed object from said plural objects stored in said server storage device; said information processing server referring to said installed list to select from said plural objects stored in said server storage device a link object including said unique information and the URL, said link object being linked to said needed object and not being stated in the installed list, said information processing server sending said needed object and said link object to said mobile terminal as said selected object.

11. The information processing system according to claim 10, wherein said information processing server forms an install execute sequence for installing said needed object and the link object in a preset sequence and sends said needed object and the link object in a preset sequence to said mobile terminal.

12. The information processing system according to claim 11, wherein if the communication between said mobile terminal and the said information processing server is interrupted during the install processing as from transmission of said install request from said mobile terminal to said information processing server until the object from said information processing server is installed in said terminal storage device, said information processing server discontinues the install processing in accordance with said install execute sequence;

said mobile terminal sending an installation re-initiating request to said information processing server in case the communication between said mobile terminal and the said information processing server is possible;

said information processing server on receipt of said installation re-initiating request re-initiating the discontinued install processing in accordance with said install execute sequence.

13. The information processing system according to claim 9, wherein a plurality of said set-up program codes, associated with said plural objects, are stored in said server storage device, wherein when said set-up program code, stored in said server storage device, is updated to a latest set-up program codes, said information processing server refers to said list of state of use of the objects to transmit said latest set-up program code associated with each of the objects of the updated object group, among the plural objects stored in said server storage device, to said mobile terminal, and wherein said mobile terminal updating said set-up program code stored in said terminal storage device to said latest set-up program code.

14. The information processing system according to claim 9, wherein said terminal identification information as well as said unique information and the URL of each of said updated objects where said malfunction has occurred are stated by said mobile terminal in said malfunction report;

said information processing server storing said malfunction report in said server storage device.

15. The information processing system according to claim 9, wherein said set-up program code comprises a program code where said malfunction occurs, and wherein said mobile terminal sends said malfunction report to said information processing server in a case of coincidence of said program code and the set-up program code.

16. The information processing system according to claim 9, wherein said malfunction report is included in said recovery request.

17. A mobile terminal connected over a network to an information processing server including a server storage device having stored therein a plurality of objects, said mobile terminal including:

a management unit for forming an install list; each of said objects including unique information and a URL (Uniform Resource Locator) for accessing said information processing server for updating said plurality of objects, said unique information and the URL of a needed object necessary for installation, among said plural objects being stated in said install list;

a communication unit for transmitting an install request including said install list to said information processing server, said install request being such information in which said information processing server refers to said install list to select the object for transmission from said plural objects stored in said server storage device to transmit the selected object to said communication unit;

a terminal storage device in which a group of objects among said plural objects are installed, said management unit forms an installed list stating unique information and the URL of said group of objects, said install request further including said installed list and comprising such information in which said information processing server refers to said installed list to form a list of unneeded objects, having therein unique information and a URL of an unneeded object which becomes unnecessary when said selected object among said objects of said object group has been installed in said terminal storage device, said list of unneeded objects being transmitted along with said selected object to said communication unit;

a controller for installing said selected object sent from said information processing server in said terminal storage device and for referring to said list of unneeded objects from said information processing server to delete said unneeded objects from said group of objects, said selected object and the deleted objects are stored by said controller as an updated object group in said terminal storage device, wherein said install request further includes terminal identification information for discriminating said mobile terminal and comprises such information in which said information processing server is responsive to said install request to form a list of state of use of the objects in said server to store said list of state of use of the objects in said server storage device, wherein said list of state of use of the objects having stated therein by said information processing server the terminal identification information, the unique information and the URL of the unneeded object, presently deleted, the unique information and the URL of the object group having said unneeded object deleted, and the unique information and the URL of the selected presently newly installed object, wherein if a malfunction has occurred in executing each object of said updated object group, installed in said terminal storage device, said communication unit sends to said information processing server a recovery request which comprises said install request for restoring said updated object group installed in said terminal storage device to said object group, wherein said recovery request including a recovery request list, including said terminal identification information and said unique information and the URL of said updated object group installed in said terminal storage device, stated by said mobile terminal, said recovery request being such information in which the information processing server refers to said recovery request list and the list of state of use of the objects stored in said server storage device to select from said plural objects stored in said server storage device said unneeded object to be installed by said controller in said terminal storage device, said information processing server forming a list of unneeded restoration objects stating said unique information and the URL of the selected object which becomes unnecessary when said unneeded object among the objects of the updated object group has been installed on said terminal storage device, said information processing server sending said list of unneeded restoration objects along with said unneeded object to said communication unit; and a conversion unit for converting each updated object into a program code, which comprises a form of using each updated object on said mobile terminal, in executing each object of said updated object group installed on said terminal storage device, wherein said terminal storage device includes a set-up program code associated with each of the objects of the updated object group, wherein said management unit forms a malfunction report representing each updated object where said malfunction has occurred, based on a result of collation between said program code and the set-up program code, and wherein said communication unit sends the malfunction report to said information processing server.

18. The mobile terminal according to claim 17, wherein said install request comprises such information in which said information processing server refers to said install list to select said needed object from said plural objects stored in said server storage device, said information processing server also referring to said installed list to select from said plural objects stored in said server storage device a link object which is linked to said needed object and which includes said unique information and the URL not stated in said installed list to send the needed object and the link object as said selected object to said communication unit.

19. The mobile terminal according to claim 18, wherein said install request comprises such information in which said information processing server forms an install execute sequence for performing the installation of said needed object and said link object in a preset sequence to send said needed object and said link object in a preset sequence to said communication unit in accordance with said install execute sequence.

20. The mobile terminal according to claim 19, wherein if the communication between said communication unit and said information processing server is interrupted during the install processing as from transmission of said install request by said communication unit to said information processing server until the object from said information processing server is installed by said controller in said terminal storage device, said install processing is discontinued by said information processing server in accordance with said install execute sequence; and said communication unit sending an installation re-initiating request for re-initiating the discontinued install processing to said information processing server in case the communication between said mobile terminal and the said information processing server is possible.

21. The mobile terminal according to claim 17, wherein a plurality of said set-up program codes, associated with said plural objects, are stored in said server storage device, and wherein when said set-up program codes, stored in said server storage device, are updated to the latest set-up program codes, said information processing server refers to said list of state of use of the objects to transmit said latest set-up program code associated with each of the objects of the updated object group, among the plural objects stored in said server storage device, to said mobile terminal, said controller updating said set-up program code stored in said terminal storage device to said latest set-up program code.

22. The mobile terminal according to claim 17, wherein said terminal identification information, as well as said unique information and the URL of each of said updated objects where said malfunction has occurred, is stated by said management unit in said malfunction report, said information processing server storing said malfunction report in said server storage device.

23. The mobile terminal according to claim 17, wherein said set-up program code comprises a program code where said malfunction occurs; and wherein said communication unit sends said malfunction report to said information processing server in a case of coincidence of said program code and the set-up program code.

24. The mobile terminal according to claim 17, wherein said malfunction report is contained in said recovery request.

25. A mobile terminal connected over a network to an information processing server including a server storage device having stored therein a plurality of objects, said mobile terminal comprising:

a terminal storage device in which a group of objects among said plural objects are installed;

a management unit for forming an install list and an installed list, said install list representing a needed object, among said plural objects, which is necessary for installation; said installed list representing said object group installed in said terminal storage device;

a communication unit for transmitting an install request, including said install list and the installed list, to said information processing server, said install request being such information in which said information processing server refers to said install list to select the object for transmission from said plural objects stored in said server storage device; said information processing server further referring to said installed list to form a list of unneeded objects representing an object which becomes unnecessary when the selected object among the objects of said object group is installed in said terminal storage device, said selected object and the list of unneeded objects being sent to said communication unit, wherein each of said plural objects includes unique information and a URL (Uniform Resource Locator) for accessing said information processing server for updating, wherein said unique information and the URL of said needed object is stated by said management unit in said install list, wherein unique information and the URL of said group of objects are stated by said management unit in said installed list, wherein said unique information and the URL of said unneeded object are stated by said information processing server in said list of unneeded objects:

a controller for installing said selected object sent from said information processing server in said terminal storage device and for referring to said list of unneeded objects from said information processing server to delete said unneeded objects from said group of objects, wherein said selected object and the deleted objects are stored by said controller as an updated object group in said terminal storage device, wherein said install request further includes terminal identification information for discriminating said mobile terminal and comprises such information in which said information processing server is responsive to said install request to form a list of state of use of the objects in said server to store said list of state of use of the objects in said server storage device, wherein said list of state of use of the objects having stated therein by said information processing server the terminal identification information, the unique information and the URL of the unneeded object, presently deleted, the unique information and the URL of the object group having said unneeded object deleted, and the unique information and the URL of the selected presently newly installed object, wherein if a malfunction has occurred in executing each object of said updated object group, installed in said terminal storage device, said communication unit sends to said information processing server a recovery request which comprises said install request for restoring said updated object group installed in said terminal storage device to said object group, wherein said recovery request including a recovery request list, including said terminal identification information and said unique information and the URL of said updated object group installed in said terminal storage device, stated by said mobile terminal, wherein said recovery request being such information in which the information processing server refers to said recovery request list and the list of state of use of the objects stored in said server storage device to select from said plural objects stored in said server storage device said unneeded object to be installed by said controller in said terminal storage device, wherein said information processing server forming a list of unneeded restoration objects stating said unique information and the URL of the selected object which becomes unnecessary when said unneeded object among the objects of the updated object group has been installed on said terminal storage device, wherein said information processing server sending said list of unneeded restoration objects along with said unneeded object to said communication unit; and a conversion unit for converting each updated object into a program code, which comprises a form of using each updated object on said mobile terminal, in executing each object of said updated object group installed on said terminal storage device, wherein said terminal storage device including a set-up program code associated with each of the objects of the updated object group, wherein said management unit forming a malfunction report representing each updated object where said malfunction has occurred, based on a result of collation between said program code and the set-up program code, and wherein said communication unit sending the malfunction report to said information processing server. Image Page 12

26. The mobile terminal according to claim 25, wherein said install request comprises such information in which said information processing server refers to said install list to select said needed object from said plural objects stored in said server storage device, said information processing server also referring to said installed list to select from said plural objects stored in said server storage device a link object which is linked to said needed object and which includes said unique information and the URL not stated in said installed list to send the needed object and the link object as said selected object to said communication unit.

27. The mobile terminal according to claim 26,, wherein said install request comprises such information in which said information processing server forms an install execute sequence for performing an installation of said needed object and said link object in a preset sequence to send said needed object and said link object in a preset sequence to said communication unit in accordance with said install execute sequence.

28. The mobile terminal according to claim 27, wherein if the communication between said communication unit and said information processing server is interrupted during the install processing as from transmission of said install request by said communication unit to said information processing server until the object from said information processing server is installed by said controller in said terminal storage device, said install processing is discontinued by said information processing server in accordance with said install execute sequence, said communication unit sending an installation re-initiating request for re-initiating the discontinued install processing to said information processing server in a case the communication between said mobile terminal and the said information processing server is possible.

29. The mobile terminal according to claim 25, wherein a plurality of said set-up program codes, associated with said plural objects, are stored in said server storage device; and wherein when said set-up program codes, stored in said server storage device, are updated to latest set-up program codes, said information processing server refers to said list of state of use of the objects to transmit said latest set-up program code associated with each of the objects of the updated object group, among the plural objects stored in said server storage device, to said mobile terminal;

said controller updating said set-up program code stored in said terminal storage device to said latest set-up program code.

30. The mobile terminal according to claim 25, wherein said terminal identification information as well as said unique information and the URL of each of said updated objects where said malfunction has occurred is stated by said management unit in said malfunction report;

said information processing server storing said malfunction report in said server storage device.

31. The mobile terminal according to claim 30, wherein said set-up program code comprises a program code where said malfunction occurs, and wherein said communication unit sends said malfunction report to said information processing server in a case of coincidence of said program code and the set-up program code.

32. The mobile terminal according to claim 25, wherein said malfunction report is contained in said recovery request.

33. An information processing server connected to a mobile terminal over a network, comprising:
- a server storage device having stored therein a plurality of objects, each of said objects including unique information and a URL (Uniform Resource Locator) for accessing to the information processing server for updating said plurality of objects;
- a server communication unit for receiving an install request from said mobile terminal, said install request including an install list having therein said unique information and the URL of a needed object, among said plural objects, that is necessary for installation; and
- a server management unit for referring to said install list for selecting an object for transmission from the plural objects stored in said server storage device, said server communication unit transmitting the selected object to said mobile terminal,
- wherein a group of objects among said plural objects are installed in the terminal storage device of said mobile terminal,
- said install request further including an installed list including unique information and the URL of said object group,
- wherein said server management unit refers to said installed list to form a list of unneeded objects including the unique information and the URL of an unneeded object, that is an object which becomes unnecessary when said selected object of the group of objects is installed in said terminal storage device, said server communication unit transmitting the list of unneeded objects along with the selected object to said mobile terminal,
- wherein said selected object is installed by said mobile terminal in said terminal storage device, said mobile terminal referring to said list of unneeded objects, said unneeded objects among the objects of the object group is deleted by said mobile terminal, and
- wherein said selected object and the deleted objects are stored in said terminal storage device as an updated object group,
- wherein said install request further includes the terminal identification information for discriminating said mobile terminal,
- wherein said server management unit forms a list of state of use of the objects in said server, responsive to said install request, to store said list in said server storage device.
- wherein said list of state of use of the objects having therein said terminal identification information, said unique information and the URL of the unneeded object, presently deleted, said unique information and the URL of said group of objects having said unneeded object deleted, and said unique information and the URL of the presently newly installed selected object, stated by the information processing server,
- wherein said server communication unit receives, from said mobile terminal, a recovery request which comprises said install request for restoring said updated object group, installed in said terminal storage device, to said object group,
- wherein said recovery request being sent by said mobile terminal when a malfunction has occurred in executing each object of said updated object group, installed in said terminal storage device, by said mobile terminal, and including a recovery request list having stated therein by said mobile terminal the terminal identification information and the unique information and the URL of the updated object group installed in said terminal storage device,
- wherein said server management unit refers to said recovery request list and the list of state of use of the objects, stored in said server storage device, to select from said plural objects stored in said server storage device said unneeded object to be installed by said mobile terminal in said terminal storage device: said server management unit forming a list of unneeded restoration objects stating said unique information and the URL of the selected object which becomes unnecessary when said unneeded object among the objects of the updated object group has been installed on said terminal storage device,
- wherein said server communication unit sending said list of unneeded restoration objects along with said unneeded object to said mobile terminal,
- wherein a set-up program code associated with each of the objects of the updated object group is stored in said terminal storage device,
- wherein said server communication unit receives a malfunction report from said mobile terminal, and
- wherein said malfunction report being sent from said mobile terminal based on a result of collation between the set-up program code and the program code converted by said mobile terminal into a form of use on said mobile terminal from each updated object when each updated object of the updated object group installed on said terminal storage device is executed by said mobile terminal, said malfunction report representing each updated object suffering from the malfunction.

34. The information processing server according to claim 33 wherein said server management unit refers to said install list to select said needed object from the plural objects stored in said server storage device; said server management unit also referring to said installed list to select from said plural objects stored in said server storage device a link object including said unique information and the URL, which is linked to said needed object and which is not stated in the installed list, and
- wherein said server communication unit sending said unneeded object and the link object as said selected objects to said mobile terminal.

35. The information processing server according to claim 34, wherein
- said server management unit forms an install execute sequence for installing said needed object and the link object in a preset sequence;
- said server communication unit sending said needed object and the link object in a preset sequence to said mobile terminal.

36. The information processing server according to claim 35, wherein if a communication between said mobile terminal and said server communication unit is interrupted during an install processing as from transmission of said install request from said mobile terminal to said server communication unit until the object from said server communication unit is installed in said terminal storage device, said server communication unit discontinues the install processing in accordance with said install execute sequence; and
- wherein if the communication between said mobile terminal and said server communication unit is possible, said server communication unit receives from said mobile terminal an installation re-initiation request for re-initiating the installation processing, once discontinued, in accordance with said install execute sequence.

37. The information processing server according to claim 33, wherein said set-up program code associated with each of said plural objects is stored in said server storage device, and wherein when said set-up program code stored in said server storage device is updated to a latest set-up program code, said server management unit refers to said list of state of use of the objects to select said latest set-up program code associated with each of the objects of the updated object group among said plural objects stored in said server storage device, said server communication unit sending said latest set-up program code to said mobile terminal, said set-up program code being stored in said terminal storage device being updated to said latest set-up program code.

38. The information processing server according to claim 33, wherein said malfunction report has therein said terminal identification information, the unique information and the URL of the updated object suffering from the malfunction, stated by said mobile terminal;

said server management unit storing said malfunction report in said server storage device.

39. The information processing server according to claim 33, wherein said set-up program code comprises a program code where said malfunction occurs, and wherein said malfunction report is sent by said mobile terminal when said program code coincides with said set-up program code.

40. The information processing server according to claim 33, wherein said malfunction report is included in said recovery request.

41. An information processing server connected over a network to a mobile terminal including a terminal storage device having installed therein a group of objects among a plurality of objects, said information processing server comprising:

a server storage device having stored therein said plural objects;

a server communication unit for receiving an install request from said mobile terminal, said install request including an install list and an installed list, said install list representing a needed object among said plural objects that is necessary for installation and said installed list representing said group of objects installed in said terminal storage device; and a server management unit for referring to said install list to select an object for transmission from said plural objects stored in said server storage device, said server management unit also referring to said installed list to form a list of unneeded objects, among the objects of said group of objects, said unneeded objects being objects which become unnecessary when said selected object has been installed on said terminal storage device, said server communication unit sending said selected object and the list of unneeded objects to said mobile terminal, wherein each of said plural objects includes unique information and a URL (Uniform Resource Locator) for accessing to said information processing server for updating, wherein said install list having therein said unique information and the URL of said needed object stated by said mobile terminal, wherein said installed list having therein unique information and the URL of said object group stated by said mobile terminal, wherein said list of unneeded objects having therein the unique information and the URL of said unneeded objects stated by said server management unit, wherein said selected object is installed by said mobile terminal in said terminal storage device: said mobile terminal referring to said list of unneeded objects, wherein said unneeded objects among the objects of the object group being deleted by said mobile terminal, wherein said selected object and the deleted objects are stored in said terminal storage device as an updated object group, wherein said install request further includes a terminal identification information for discriminating said mobile terminal, wherein said server management unit forms a list of state of use of the objects in said server, responsive to said install request, to store said list in said server storage device, wherein said list of state of use of the objects having therein said terminal identification information, said unique information and the URL of the unneeded object, presently deleted, said unique information and the URL of said group of objects having said unneeded object deleted, and said unique information and the URL of the presently newly installed selected object, stated by the information processing server, wherein said server communication unit receives, from said mobile terminal, a recovery request which is said install request for restoring said updated object group, installed in said terminal storage device, to said object group, wherein said recovery request being sent by said mobile terminal when a malfunction has occurred in executing each object of said updated object group, installed in said terminal storage device, by said mobile terminal, and including a recovery request list having stated therein by said mobile terminal the terminal identification information and the unique information and the URL of the updated object group installed in said terminal storage device, wherein said server management unit refers to said recovery request list and the list of state of use of the objects, stored in said server storage device, to select from said plural objects stored in said server storage device said unneeded object to be installed by said mobile terminal in said terminal storage device: said server management unit forming a list of unneeded restoration objects stating said unique information and the URL of the selected object which becomes unnecessary when said unneeded object among the objects of the updated object group has been installed on said terminal storage device, wherein said server communication unit sending said list of unneeded restoration objects along with said unneeded object to said mobile terminal, wherein said set-up program code associated with each of said plural objects is stored in said server storage device, wherein, when said set-up program code stored in said server storage device is updated to a latest set-up program code, said server management unit refers to said list of state of use of the objects to select said latest set-up program code associated with each of the objects of the updated object group among said plural objects stored in said server storage device, said server communication unit sending said latest set-up program code to said mobile terminal, wherein said set-up program code being stored in said terminal storage device being updated to said latest set-up program code, wherein said malfunction report has therein a terminal identification information, the unique information and the URL of the updated object suffering from the malfunction, stated by said mobile terminal, and wherein said server management unit storing said malfunction report in said server storage device.

42. The information processing server according to claim 41, wherein said server management unit refers to said install list to select said needed object from the plural objects stored in said server storage device; said server management unit also referring to said installed list to select from said plural objects stored in said server storage device a link object including said unique information and the URL, which is linked to said needed object and which is not stated in the installed list, said server communication unit sending said unneeded object and the link object as said selected objects to said mobile terminal.

43. The information processing server according to claim 42, wherein said server management unit forms an install execute sequence for installing said needed object and the link object in a preset sequence;

said server communication unit sending said needed object and the link object in a preset sequence to said mobile terminal.

44. The information processing server according to claim 43, wherein if the communication between said mobile terminal and said server communication unit is interrupted during an install processing as from transmission of said install request from said mobile terminal to said server communication unit until the object from said server communication unit is installed in said terminal storage device, said server communication unit discontinues the install processing in accordance with an install execute sequence; and wherein if a communication between said mobile terminal and said server communication unit is possible, said server communication unit receives from said mobile terminal an installation re-initiation request for re-initiating the installation processing, once discontinued, in accordance with said install execute sequence.

45. The information processing server according to claim 44, wherein a set-up program code associated with each of the objects of the updated object group is stored in said terminal storage device; and wherein said server communication unit receives a malfunction report from said mobile terminal;

said malfunction report being sent from said mobile terminal based on a result of collation between the set-up program code and the program code converted by said mobile terminal into a form of use on said mobile terminal from each updated object when each updated object of the updated object group installed on said terminal storage device is executed by said mobile terminal; said malfunction report representing each updated object suffering from the malfunction.

46. The information processing server according to claim 41, wherein said set-up program code comprises a program code where said malfunction occurs, and wherein said malfunction report is sent by said mobile terminal when said program code coincides with said set-up program code.

47. The information processing server according to claim 46, wherein said malfunction report is included in said recovery request.

* * * * *